Jan. 21, 1936.   R. S. PERRY ET AL   2,028,727
CONSTRUCTION OF MACHINE TOOLS
Filed Nov. 23, 1933   15 Sheets-Sheet 3
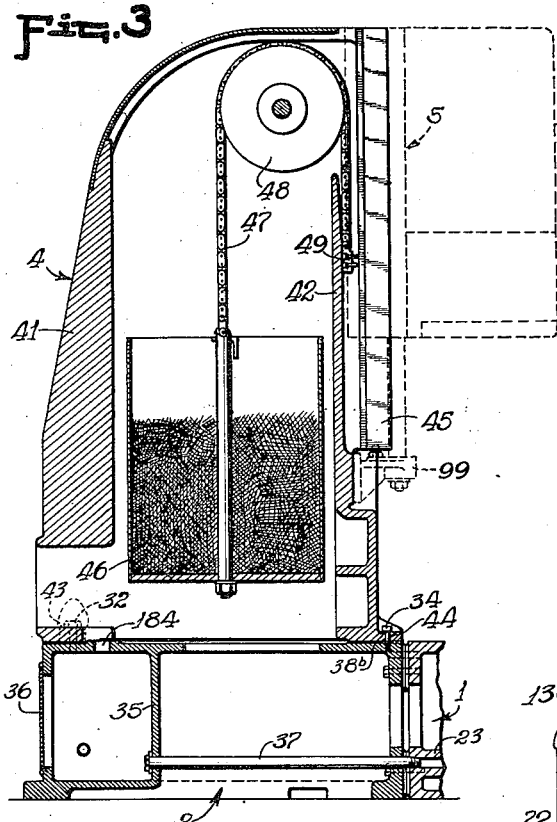
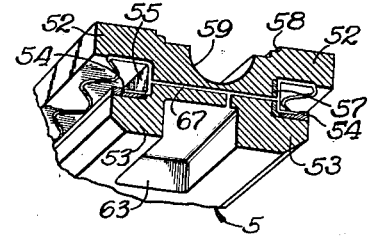
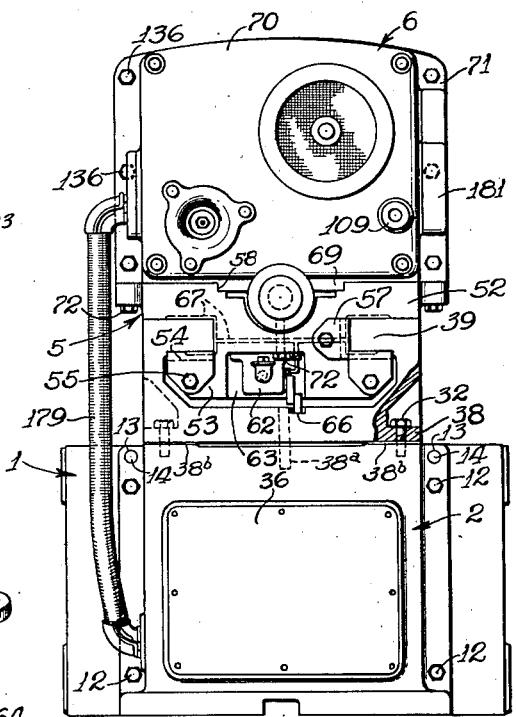
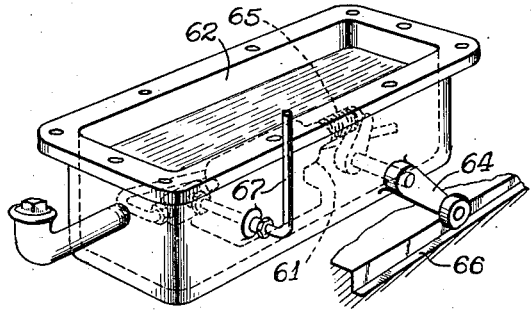
INVENTORS
Raymond S. Perry
John R. Johnson
Alexander Oberhoffken
By Chindall, Parker & Carlson
ATTORNEYS

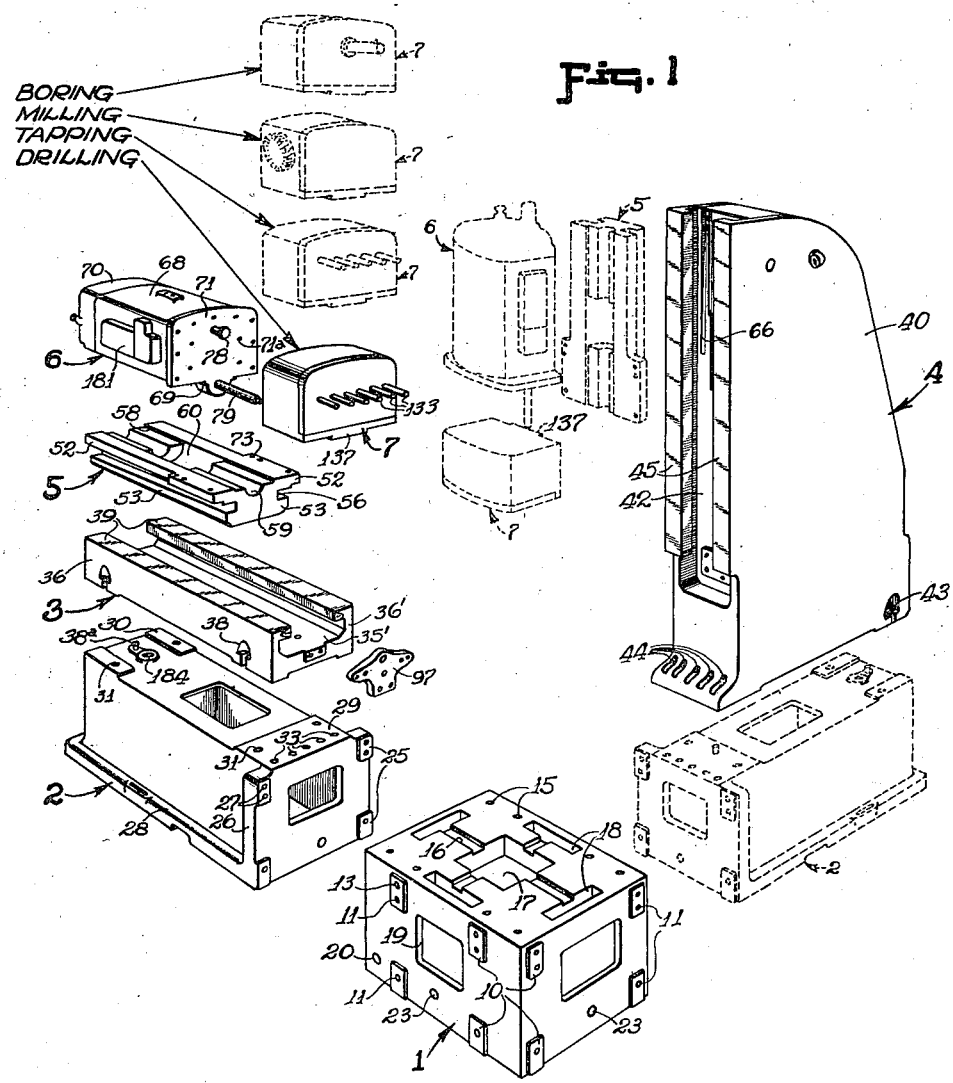

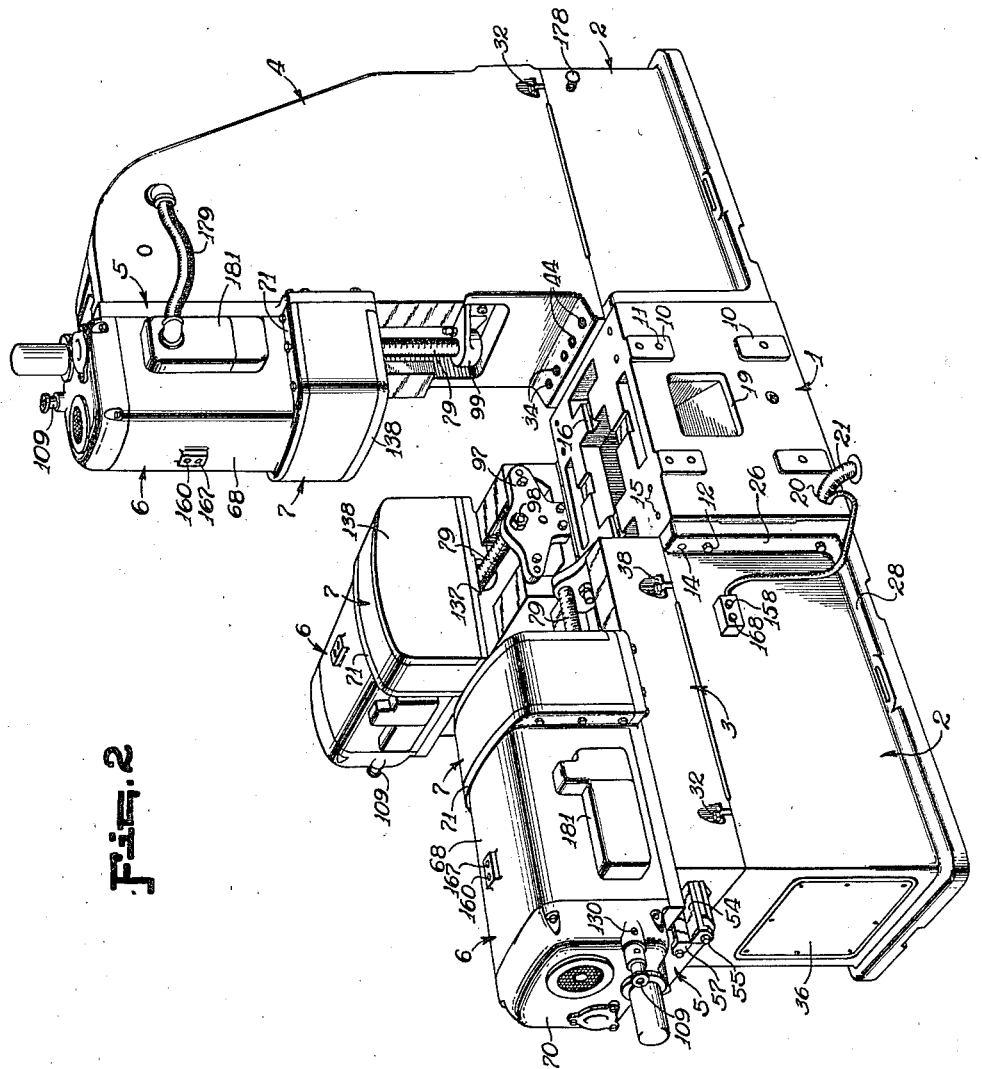

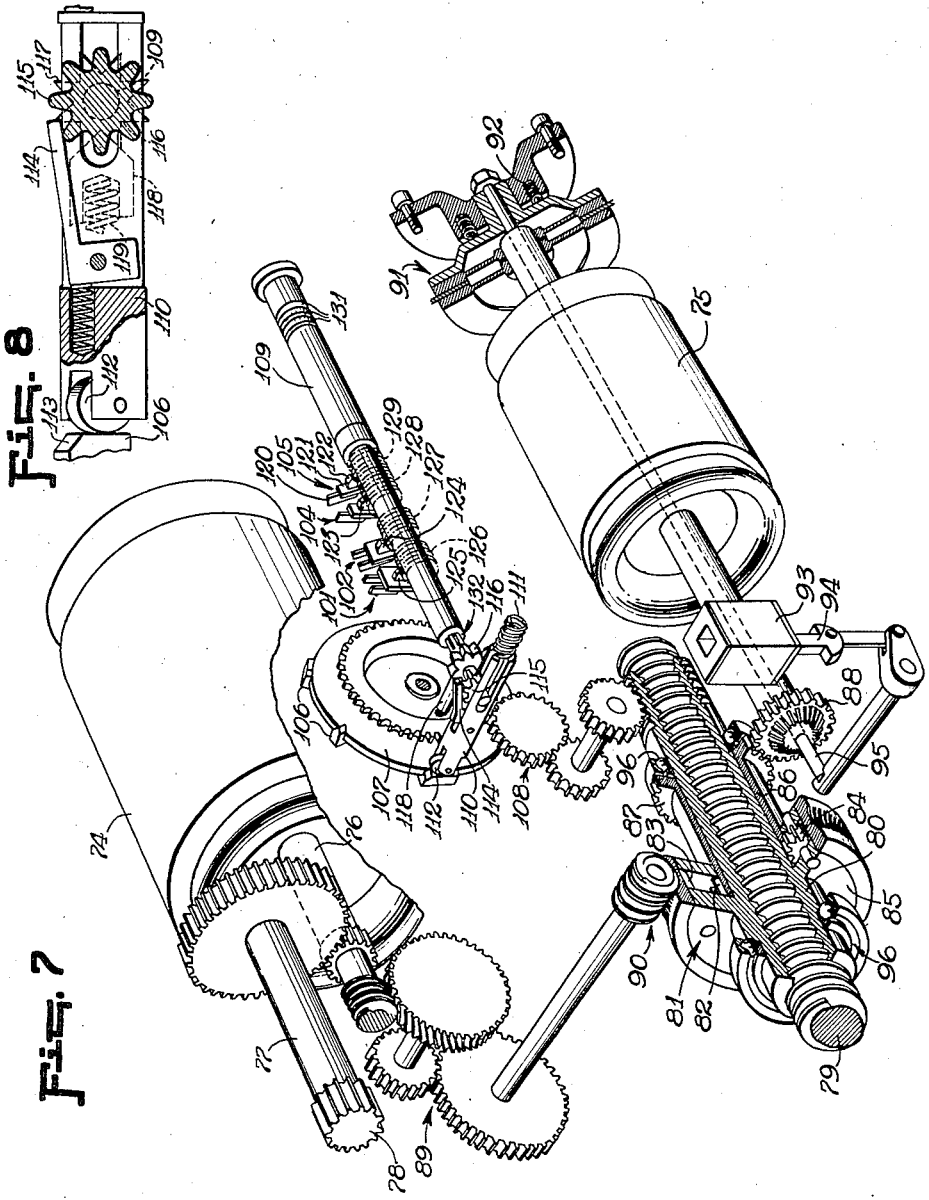

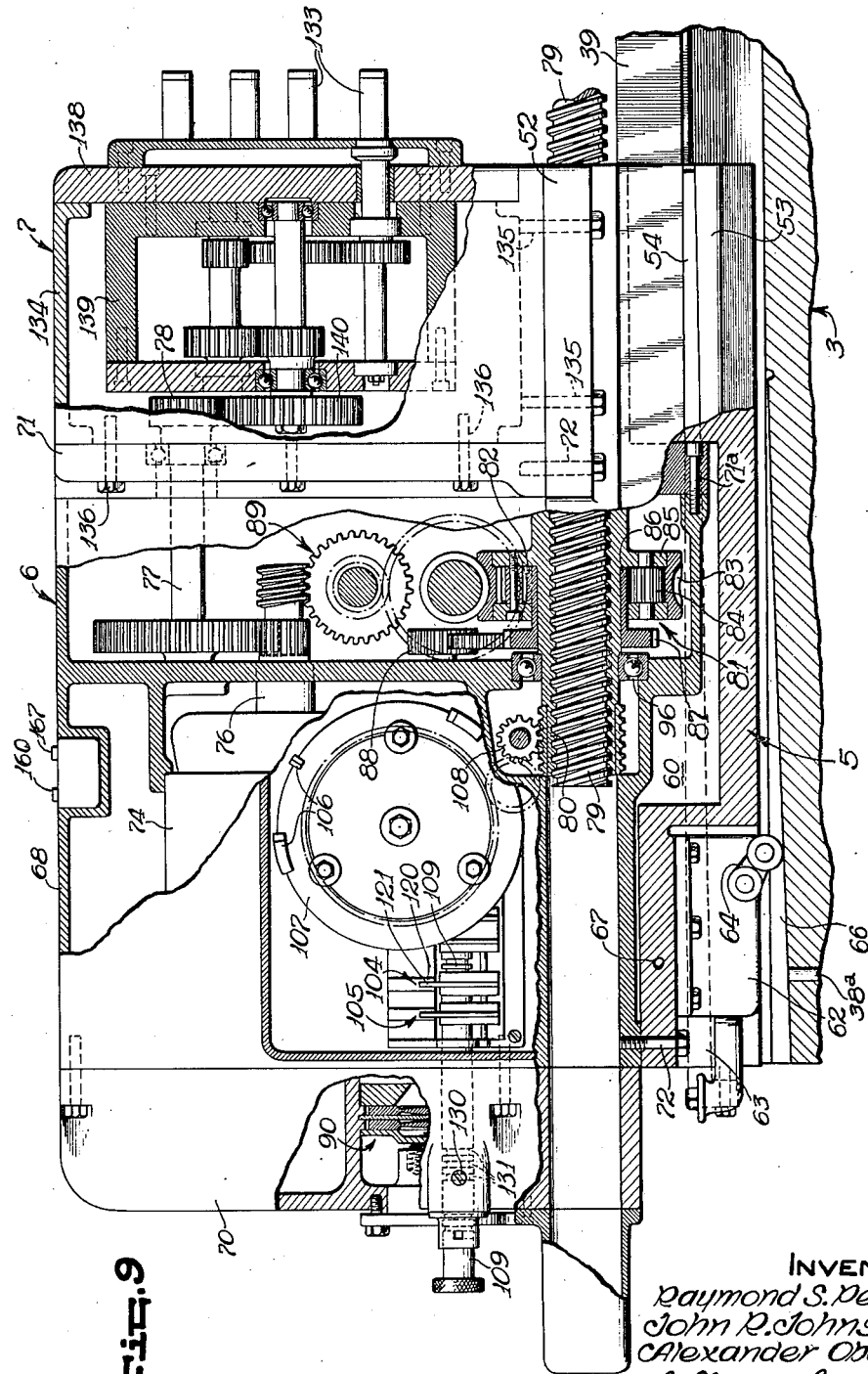

Jan. 21, 1936.  R. S. PERRY ET AL  2,028,727
CONSTRUCTION OF MACHINE TOOLS
Filed Nov. 23, 1933   15 Sheets-Sheet 6

INVENTORS
Raymond S. Perry
John R. Johnson
Alexander Oberhoffken
By Chindall, Parker + Carlson
ATTORNEYS

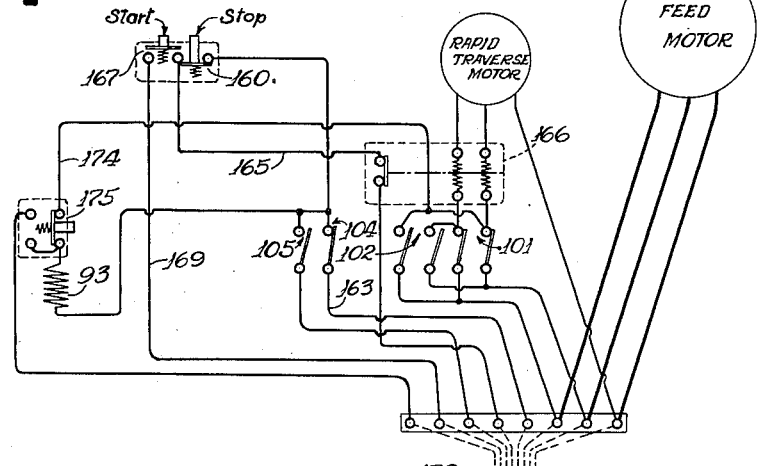
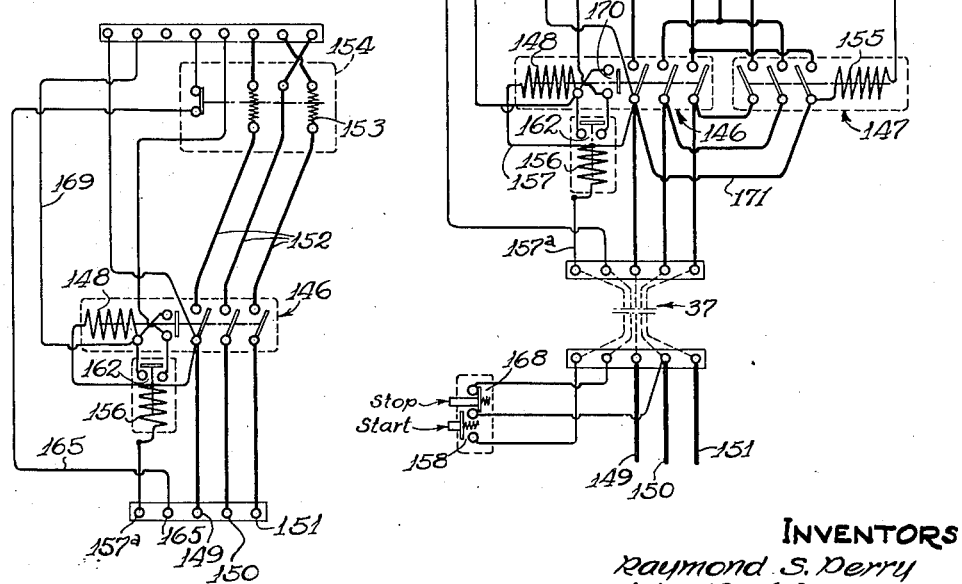

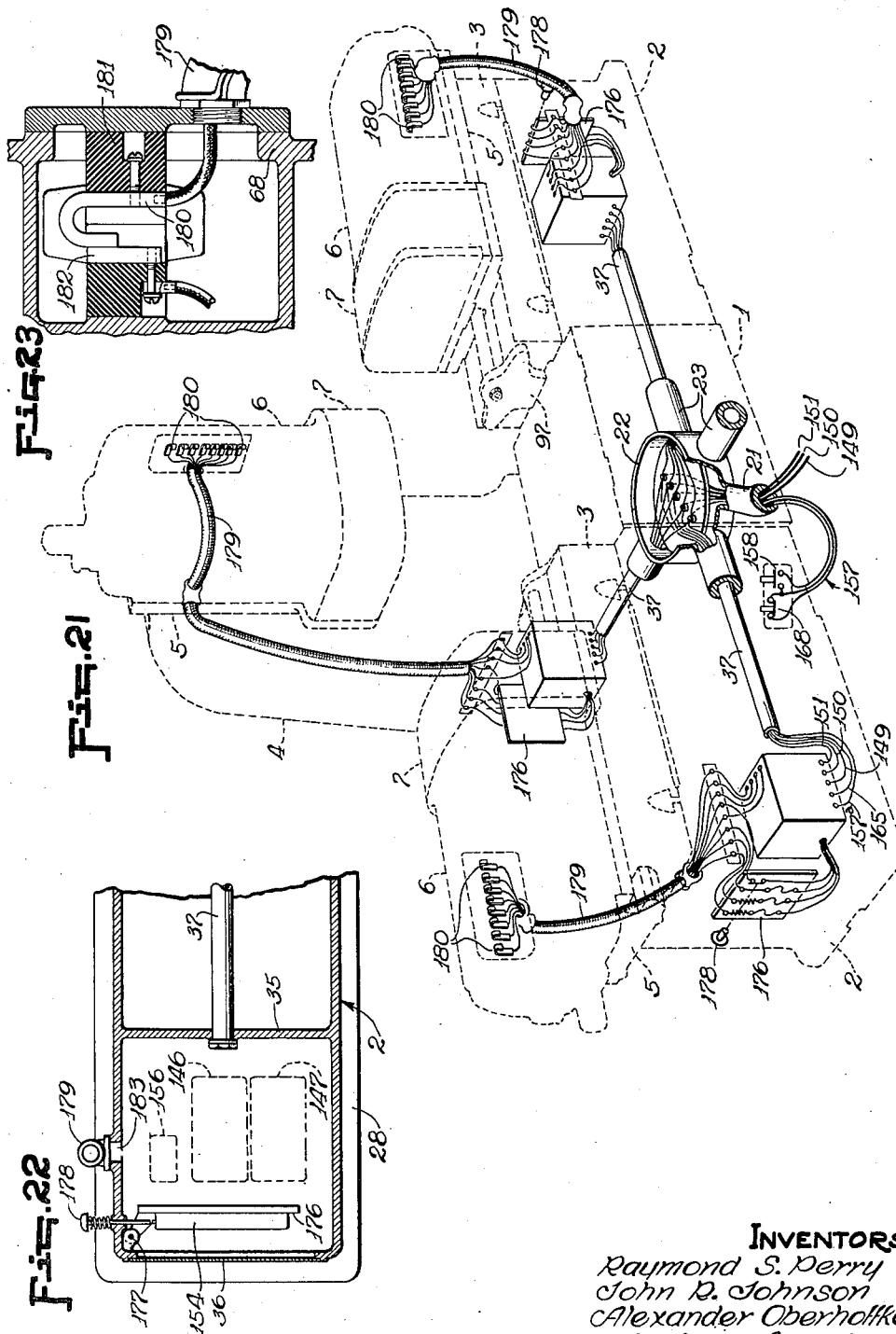

Jan. 21, 1936.  R. S. PERRY ET AL  2,028,727
CONSTRUCTION OF MACHINE TOOLS
Filed Nov. 23, 1933  15 Sheets-Sheet 9
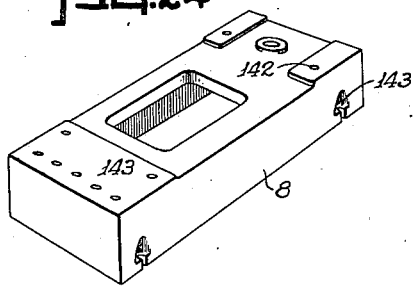
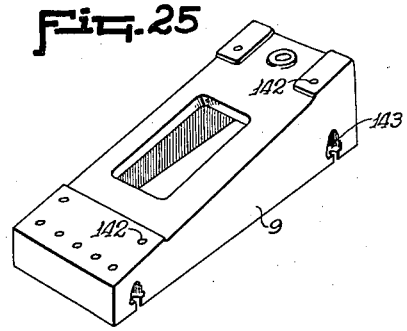
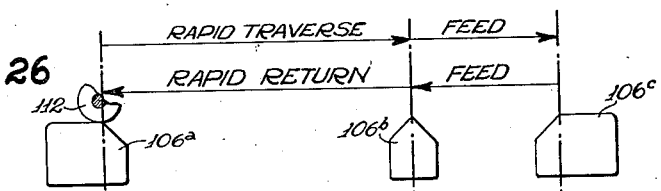
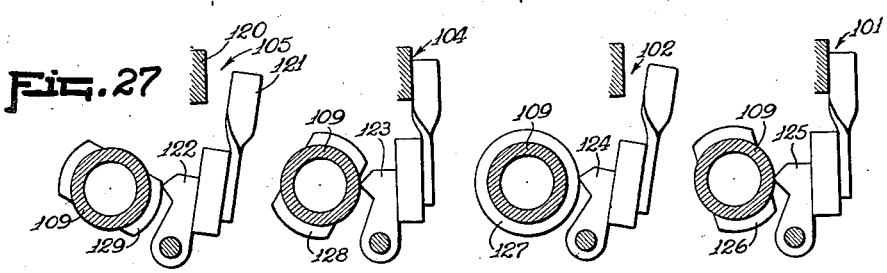
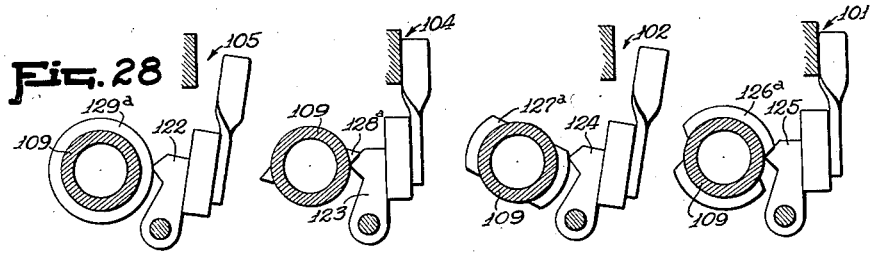
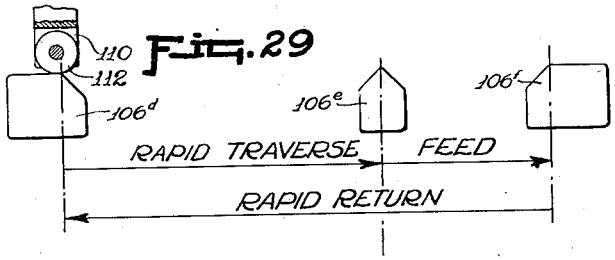
INVENTORS
Raymond S. Perry
John R. Johnson
Alexander Oberhoffken
By Chindahl Parker & Carlson
ATTORNEYS Jan. 21, 1936.    R. S. PERRY ET AL    2,028,727
CONSTRUCTION OF MACHINE TOOLS
Filed Nov. 23, 1933    15 Sheets-Sheet 10
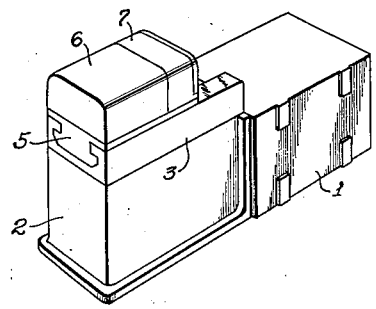
Fig. 30
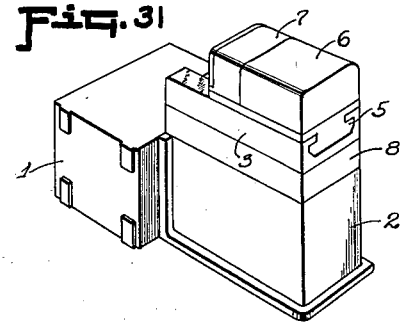
Fig. 31
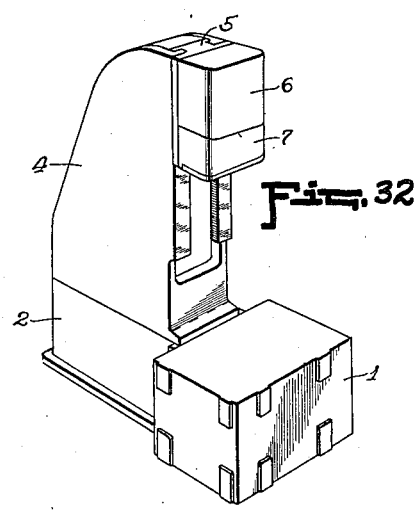
Fig. 32
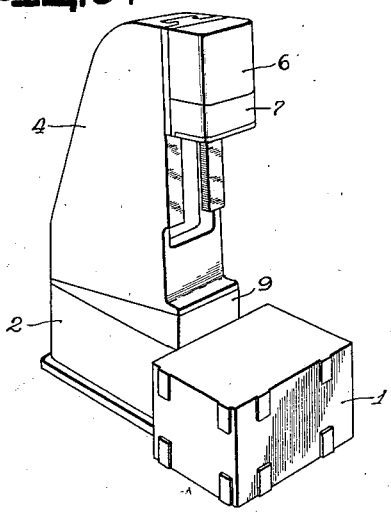
Fig. 34
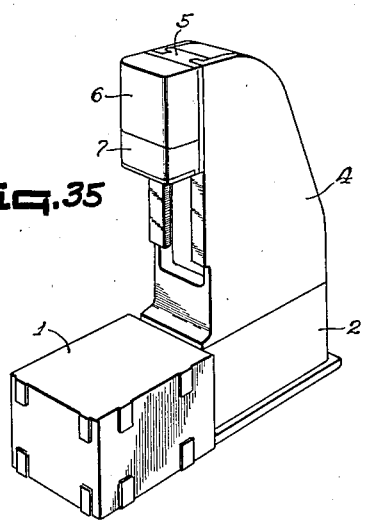
Fig. 33
Fig. 35
INVENTORS
Raymond S. Perry
John R. Johnson
Alexander Oberhoffken
By Chindell, Parker & Carlson
ATTORNEYS

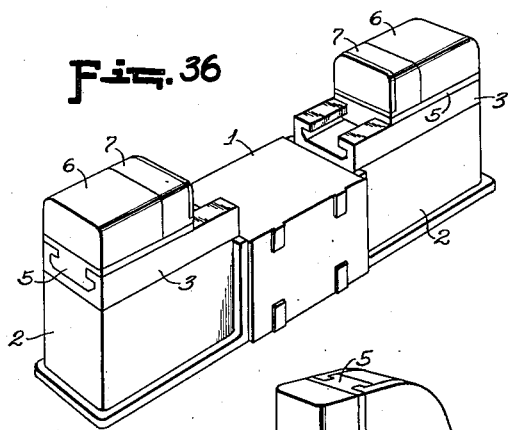
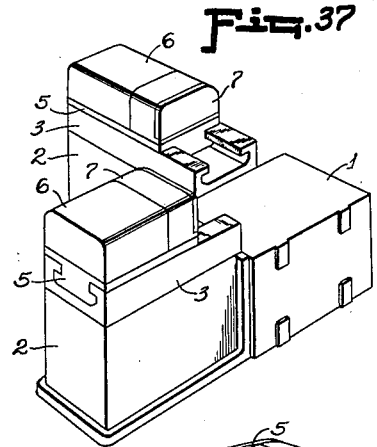
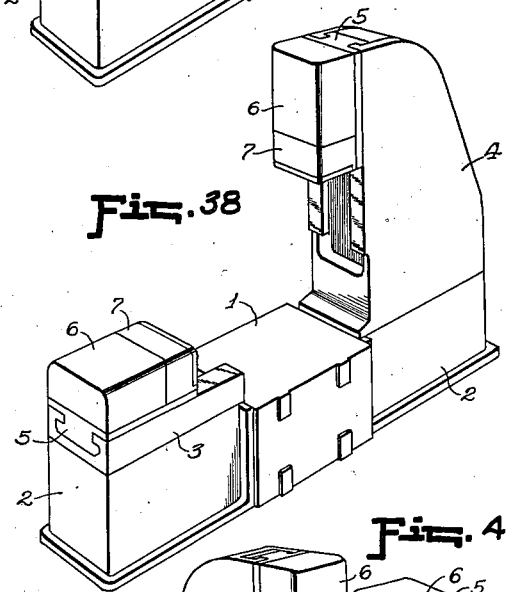
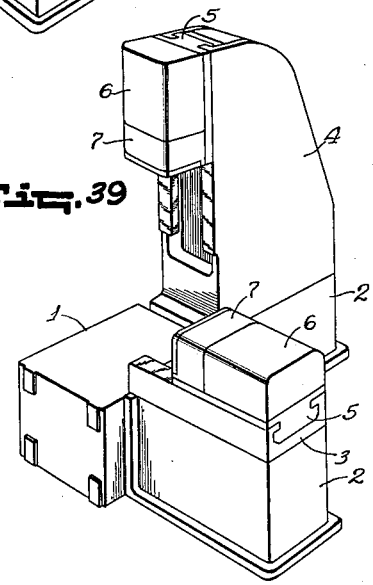
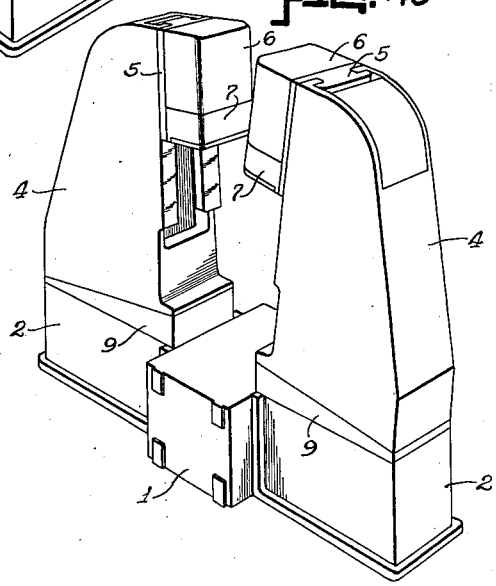

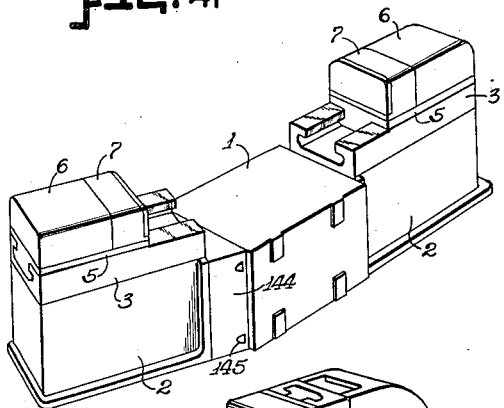
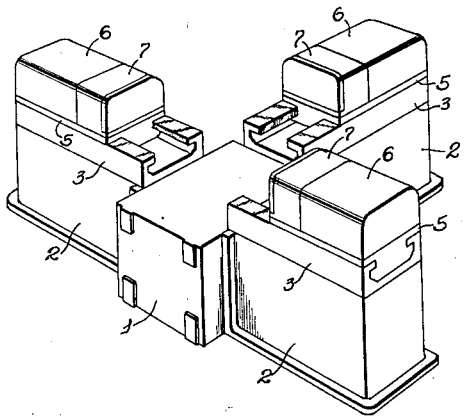
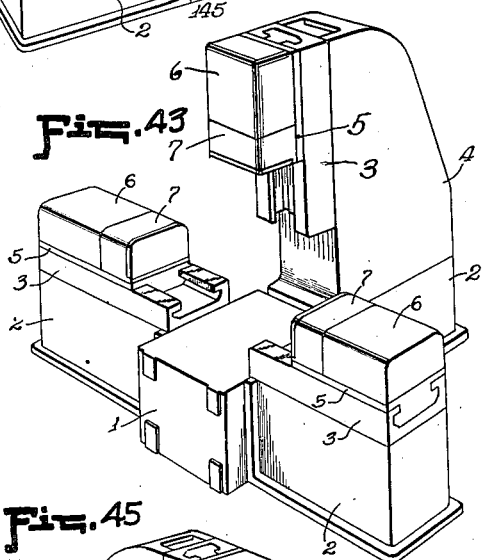
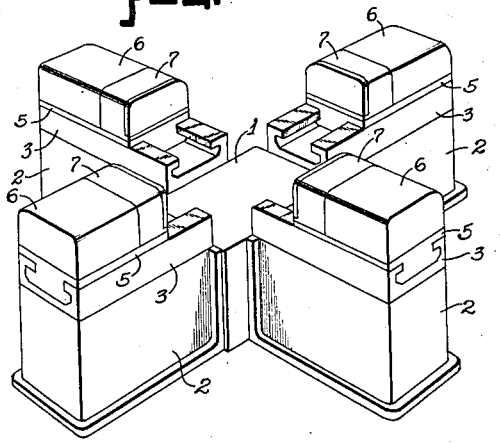
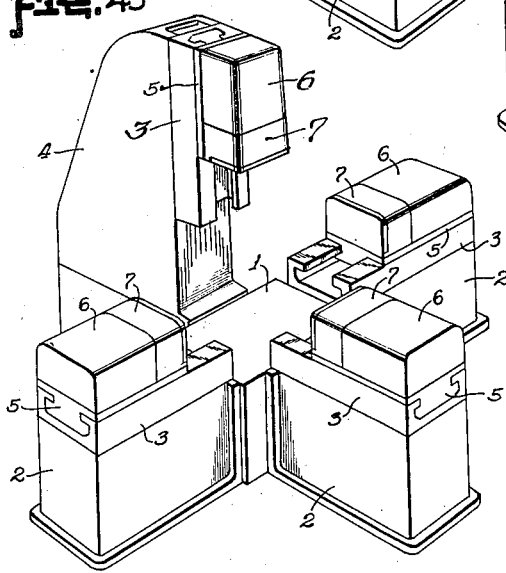

Jan. 21, 1936.   R. S. PERRY ET AL   2,028,727
CONSTRUCTION OF MACHINE TOOLS
Filed Nov. 23, 1933   15 Sheets-Sheet 13
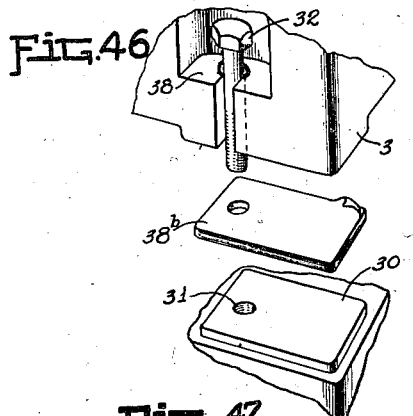
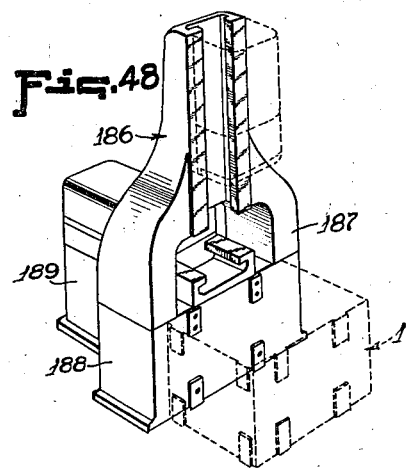
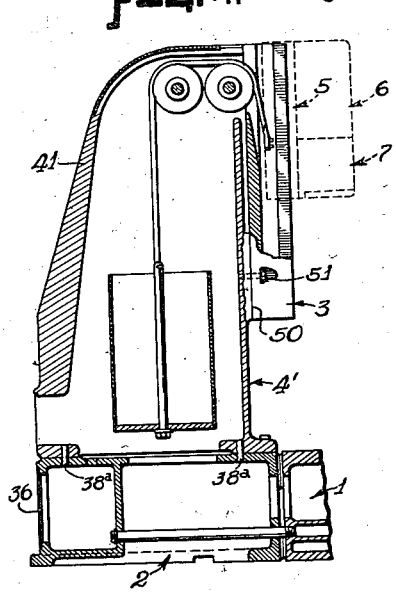
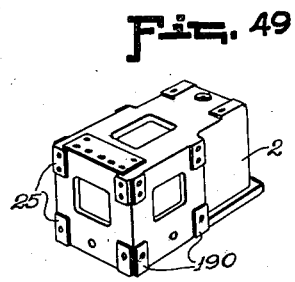
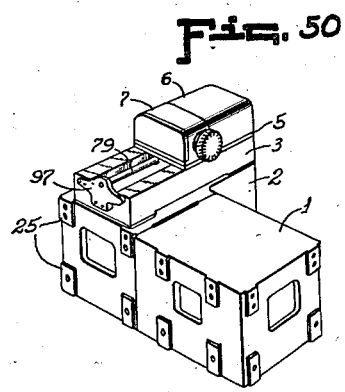
INVENTORS
Raymond S. Perry
John R. Johnson
Alexander Oberhoffken
By Chindahl, Parker & Carlson
ATTORNEYS Jan. 21, 1936.   R. S. PERRY ET AL   2,028,727
CONSTRUCTION OF MACHINE TOOLS
Filed Nov. 23, 1933   15 Sheets-Sheet 14
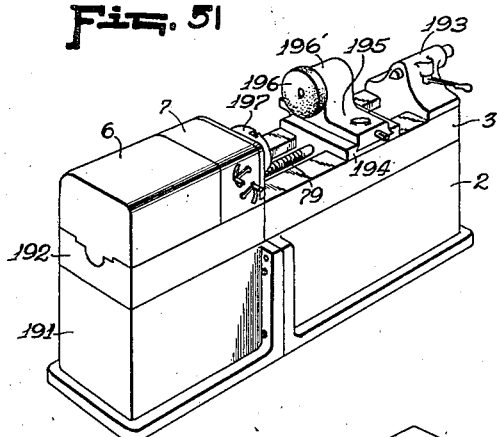
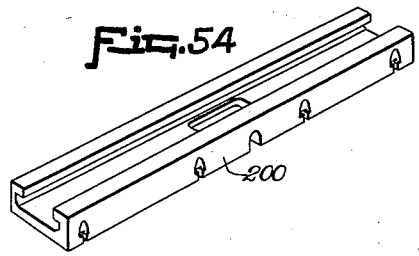
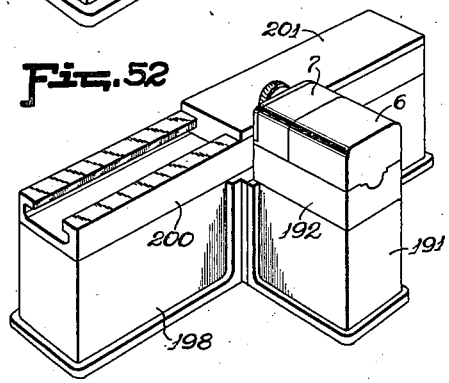
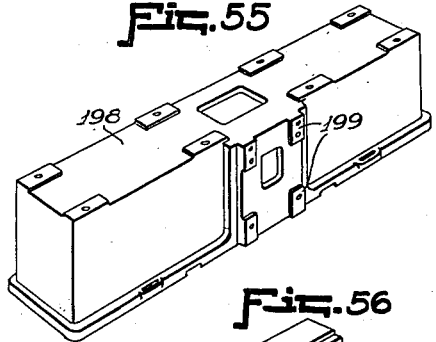
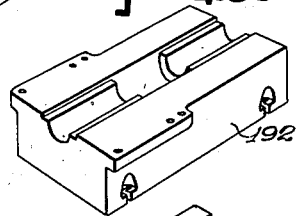
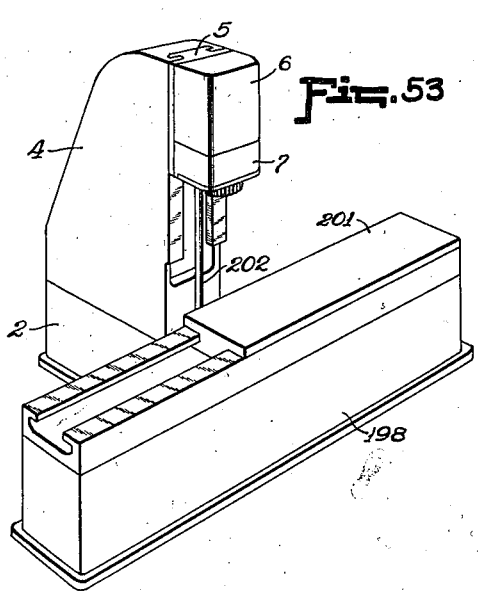
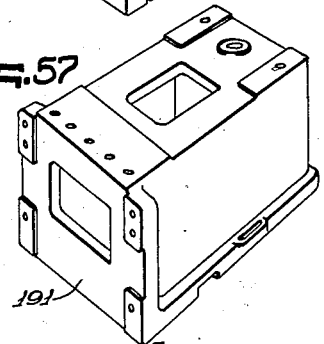
INVENTORS
Raymond S. Perry
John R. Johnson
Alexander Oberhoffken
By Chindall, Parker & Carlson
ATTORNEYS Jan. 21, 1936.  R. S. PERRY ET AL  2,028,727
CONSTRUCTION OF MACHINE TOOLS
Filed Nov. 23, 1933  15 Sheets-Sheet 15
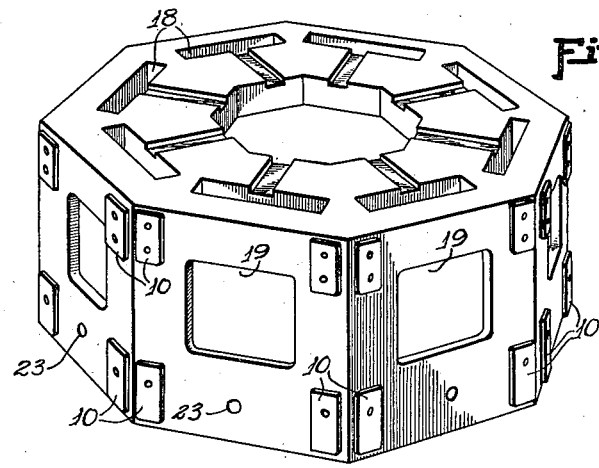
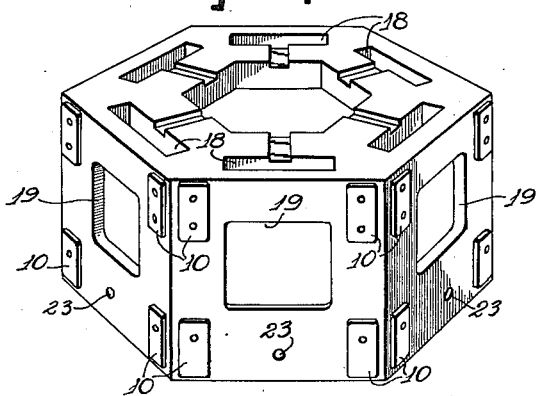
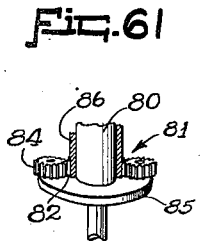
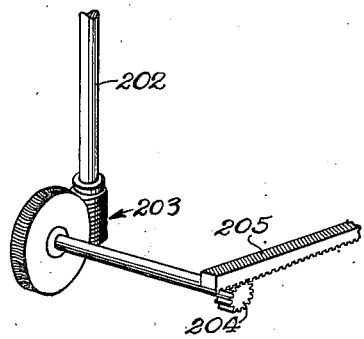
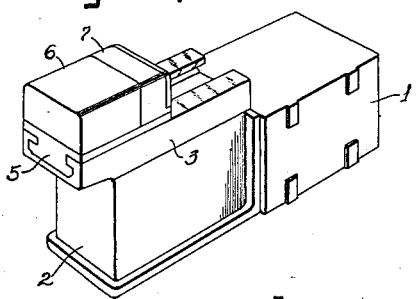
INVENTORS
Raymond S. Perry
John R. Johnson
Alexander Oberhoffken
By Lindell, Parker + Carlson
ATTORNEYS Patented Jan. 21, 1936

2,028,727

UNITED STATES PATENT OFFICE 2,028,727

CONSTRUCTION OF MACHINE TOOLS

Raymond S. Perry, John R. Johnson, and Alexander Oberhoffken, Rockford, Ill., assignors to The Ingersoll Milling Machine Company, Rockford, Ill., a corporation of Illinois Application November 23, 1933, Serial No. 699,440

39 Claims. (Cl. 29—26)

This invention relates generally to the construction of machine tools and more particularly to those for performing metal removing processes such as drilling, tapping, milling, boring, reaming, grinding and the like.

Heretofore, machine tools have usually been designed especially for the respective types of processes to be performed thereby, with the result that a machine designed for one process, such as drilling, was inherently unsuited for a different process, such as milling.

The primary object of the present invention is to provide a novel method of construction by which it is possible to build machine tools capable of performing efficiently many different types of metal removing processes.

In prior practice also, machine tools have been designed in such a way that the functions performed by the various parts of the machine were dependent upon each other and were distributed throughout the machine in such a manner as to make a variation of or an addition to these functions impracticable.

Another object of this invention is to provide a novel method in which the essential functions of various types of machine tools are distinctly segregated in a number of major structural units which are common to machines for performing a great variety of metal removing processes, as for example, the functions of supporting the work and the tool, guiding the tool or the work in their relative feeding movement, effecting such relative feeding movement, and driving the tool or the work. The invention aims to provide a method and apparatus by which a large group of different machine tools for performing a wide variety of different machining processes singly or in multiple may be built by assembling a relatively small number of interchangeable units singly or in multiple according to the functions of the desired machine and by which the machine thus built may be converted readily into any other machine of the group by omission, substitution or addition of the proper units.

Another object is to provide a novel construction of the specific units above mentioned whereby a minimum member of different kinds of units are required, whereby the complexity of the parts required to be substituted in changing from one type of machining process to another is reduced to a minimum, whereby the major driving and controlling elements are concentrated in one readily demountable and interchangeable power unit, whereby to provide a high degree of interchangeability of the units which perform analogous functions, and whereby the lines or angles of approach between the work and the tools may be varied readily.

The invention has for a general object the provision of a method and apparatus for manufacturing machine tools having the advantages of low initial manufacturing cost, increased range of utility, reduced loss to the user through obsolescence, and lowered maintenance and direct labor costs to the user.

Other objects and advantages of the invention will become apparent from the following detailed description taken in connection with the accompanying drawings, in which Figure 1 shows in perspective a group of units which may be assembled to form different machine tools in accordance with the present invention, duplicate units being shown in dotted outline.

Fig. 2 is a perspective view of a machine tool built from the units shown in Fig. 1.

Fig. 3 is a fragmentary vertical sectional view of the column and base structure of the machine shown in Fig. 2.

Fig. 4 is a fragmentary elevation taken from the opposite end of the machine shown in Fig. 2.

Fig. 5 is a fragmentary perspective view illustrating the manner of distributing lubricant to the guideways.

Fig. 6 is a perspective view of the way lubricating mechanism.

Fig. 7 shows the power driving and feeding mechanism in perspective.

Fig. 8 is a fragmentary sectional view of a part of the cycle control mechanism.

Fig. 9 is a fragmentary sectional view of the power driving and feeding mechanism.

Figs. 19 and 20 are wiring diagrams of typical cycle control circuits.

Fig. 21 shows schematically the manner of mounting the electrical conductors.

Fig. 22 is a fragmentary horizontal sectional view through one of the bed wings.

Fig. 23 is a fragmentary sectional view of one of the electrical connectors employed.

Figs. 24 and 25 are perspective views of spacers.

Fig. 26 is a schematic view of the control dogs for defining a typical machine cycle.

Fig. 27 shows the control switches and cams for defining the cycle illustrated in Fig. 26.

Fig 28 is a similar view of the cams and switches for a different cycle.

Fig. 29 is a view similar to Fig. 26 but for a different cycle.

Figs. 30 to 45 show schematically some of the different types of machines which may be built in accordance with the present method.

Fig. 46 is a fragmentary perspective view illustrating the means for facilitating alinement of certain of the machine units during assembly thereof.

Fig. 47 is a sectional view similar to Fig. 3 illustrating a modification.

Figs. 48, 50, 51, 52 and 53 are views similar to Fig. 2 illustrating modifications of the invention.

Figs. 49, 54, 55, 56, 57, 58, 59 and 60 are perspective views of modified forms of the parts.

Fig. 61 is a fragmentary sectional view of the mechanism for driving the work table of the machine shown in Fig. 53.

Figure 10:
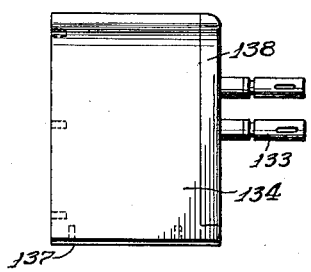
Figs. 10 to 18 are side elevational views of different types of tool or spindle units.
Figure 11:
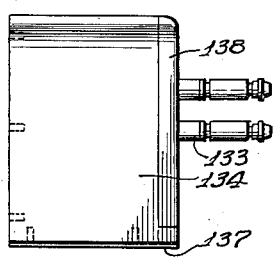
Figure 12:
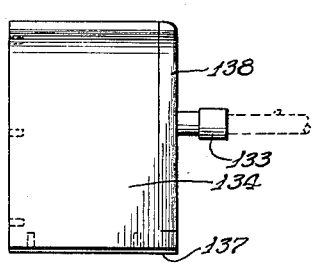
Figure 13:
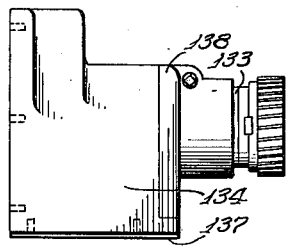

The invention is susceptible of various modifications and therefore we do not, by the present exemplary disclosure, intend to limit the invention, but aim to cover all modifications and alternatives falling within the spirit and scope of the invention as expressed in the appended claims.

The invention in general

By analysis of machine tools for performing drilling, tapping, boring, milling and allied metal-removing processes, we have found that such machines have a large number of functions in common but that heretofore these functions have been so distributed in the different machines that the assembled structures for performing the different processes differed widely in construction.

The method which we have produced involves first a segregation of all of the fundamental functions of a plurality of different types of machine tools into a relatively small number of groups of such functions, and secondly the construction of structurally separate machine units or sections capable of being assembled singly or in multiple and in different positional relationships to form any one of said machine tools and each capable, in the unitary assembly thus formed, of performing the functions of one of said groups independently of or conjointly with associated units irrespective of the variably assembled positions of the units.

As exemplified in Figs. 1 to 45 of the present disclosure, the invention is particularly adapted for the building of machines for performing drilling, tapping, boring and milling and allied machining processes singly or in multiple and for this purpose contemplates the provision of a group of structurally separate stock units having individual functional characteristics and hereinafter referred to as the pedestal 1, the bed wing 2, the slide or horizontal guide section 3, the column or vertical guide section 4, the saddle 5, the power pack 6, and the tool or spindle unit 7.

The pedestal 1, which ordinarily will be used for supporting the work-piece to be machined, constitutes, in most machines, a keystone unit around which the other units are built. The bed wing 2 cooperates with the pedestal to form the machine bed and functions as a support for the tool-carrying, actuating and guiding parts and as a rigid connection between the work and tool supports to correlate the tool and the work. The slide 3 and the column 4 are adapted to be mounted interchangeably upon the bed wing 2, their primary functions being to provide horizontal and vertical guides for the machine element which is reciprocated to produce the necessary relative movement between the work and the cutting tool. The saddle 5 is slidable on the ways on the slide or column and constitutes a support for carrying a power pack 6 and a tool unit 7.

The majority of the functions and substantially all of those which require moving parts for their performance including tool-driving, feeding of the tool and work relative to each other at different speeds and in opposite directions, and variable cycle defining are performed by mechanism, preferably electrically driven, concentrated in the power pack 6 which is carried by the saddle 5. The primary functions of the tool unit 7 are those of carrying the tool and transmitting rotary power thereto from the power pack. It is mounted on the saddle 5 for ready detachment therefrom independently of the power pack. While the tool units will vary to some extent according to the types of processes and the sizes and relative positions of the tools thereon, the construction is such as to provide for ready interchangeability of these units for performing different metal removing processes.

Where conditions require that the tools approach the work along lines or angles other than those provided for by the units already mentioned, the invention contemplates the introduction of spacing units 8 and 9 (Figs. 24 and 25) between the proper units.

With the foregoing general functional characteristics of the different units in mind, it will be observed that in accordance with our method of construction, any machine of the group contemplated may be built by preforming the requisite units, assembling the bed wings, guide sections, saddles and power pack units singly or in multiple about a pedestal in the proper positional relationship as determined by the number of processes to be performed and the angles of approach to be effected, and then associating with each power pack a tool unit characterized by the nature of the particular process to be performed thereby. For example, if it is desired to build a three-way machine having two horizontal lines and one vertical line of approach, a pedestal, three bed wings, two slides, one column, three saddles, three power packs and three tool units would be required, these units being assembled and secured together as shown in Fig. 2.

In any machine thus built, the units retain their functional indentity irrespective of the positional relation in which they are assembled so that the machine may be dismantled and the units, by the addition, subtraction, substitution or rearrangement thereof, may be utilized in the building of any other machine of the group contemplated. As a result, the method not only enables a wide variety of machine tools to be constructed from a relatively small number of elemental units, but also eliminates the hazard of obsolescence of the machines in the user's hands which heretofore has resulted from the necessary revision of manufacturing processes to conform to changes in the products manufactured.

It should here be noted that the particular size, shape and number of the individual units as well as the manner of segregating fundamental machine functions therein and particular lines of structural division therebetween may, in the broad aspects of our invention, be varied considerably. We have shown in the drawings and will now describe in detail the preferred structural exemplifications of the invention, considering first the respective elemental units.

The pedestal

This unit is fashioned for attachment of bed wings 2 thereto in various angular relations. While it may be of various cross-sectional shapes, a polygonal box-like structure is preferred. With a pedestal of oblong rectangular cross-section, such as the one herein illustrated, the formation of a rugged connection with the bed wings and location of the horizontal guideways in the common right angular relation is facilitated and, by attachment of a bed wing to a long or short side of the pedestal, some degree of adjustment of the vertical line of approach of the tool is provided for.

To permit the construction of machines having one, two, three or four horizontal angles or lines of approach, all four sides of the pedestal are fashioned for attachment of bed wings thereto. For this purpose, accurately machined pads or surfaces 10 of suitable size and location are formed on each side of the pedestal. Threaded holes 11 are provided in the pads to receive screws 12 (Figs. 2 and 4) by which the bed wings are clamped rigidly to the pedestal, and, if desired, holes 13 may be provided to receive dowels 14.

To facilitate the mounting of suitable work fixtures upon the pedestal, the top wall thereof is formed with holes 15 to receive fixture clamping devices and with keyways 16 for receiving correspondingly shaped tongues on the work fixtures (not shown). The keyways, which extend between a large central recess 17 and similar recesses 18, may be used conveniently as reference points in accurately lining up the tool guideways relative to the fixture as will be described later.

In addition to its primary function of supporting the work in most of the machines herein contemplated, the pedestal constitutes a chip receptacle and also houses the electric power conductors from which the driving mechanisms of all of the power packs are supplied. Chips falling through the apertures 17 and 18 may be removed through apertures 19, one of which is preferably provided in each of the side walls of the pedestal.

Herein the main power supply conductors are led into the pedestal through an opening 20 located near one corner so as to be readily accessible irrespective of the positions of the bed wings secured to the pedestal. These conductors extend through a conduit 21 terminating in a central junction box 22 (Fig. 21) from which conduits 23 extend through each of the vertical side walls of the pedestal. The junction box is tightly closed by a suitable removable cover (not shown).

The bed wing

Like the pedestal, the bed wing comprises a hollow casting preferably of rectangular and oblong horizontal sectional shape. In the form shown in Fig. 1, one end wall is fashioned for attachment interchangeably to a side or end wall of the pedestal and for this purpose four machined pads 25 are formed on the end wall in positions for alinement with the pedestal pads 10 when the bed wing and pedestal are assembled. The pads 25 are carried by flanges 26 having holes 27 therein through which the clamping screws 12 are extended and the dowel pins 14 are projected when the pedestal and bed wing are properly assembled. A flange 28 formed at the base of the bed wing around three sides thereof has apertures therein for receiving suitable devices for anchoring the bed wing on the foundation by which the machine is supported.

The top wall of the bed wing is fashioned for attachment of a slide 3, a column 4, or a spacer 8 or 9 thereto interchangeably. For this purpose, machined pads or surfaces 29 and 30 are formed at opposite ends of the wall with threaded holes 31 therein to receive screws 32 for clamping the slide and the rear edge of the column upon the bed wing and holes 33 for receiving screws 34 by which the forward edge of the column is secured to the bed wing.

In addition to its main function of maintaining a proper positional relation between the pedestal and guide section by which the work and a tool are carried, the bed wing forms a housing for the bulk of the electrical equipment by which the power driven mechanism is controlled as will be described later. To this end, a closet 35 closed by a door 36 is provided in the end portion of the bed wing 2 opposite the pedestal. An electrical conduit 37 extends from this closet along the bottom wall of the bed wing and terminates in a hole in register with one of the pedestal conduits 23 when the parts are joined together.

The slide

This horizontal guide section and the bed wing are made structurally separate to provide for interchangeability of the slide 3 and the column 4 on the bed wings 2 and to avoid the necessity of constructing a special tool supporting and guide assembly for each different angle of approach or length of tool travel which is encountered. With a separately formed slide, the guideways thereon may be located at various heights or at odd angles with a minimum of special equipment as by the use of vertical spacers or angle spacers 8 or 9 of varying height or angularity in the connection between the slide and bed wing and any desired line of approach thereby obtained. In addition, the cost of the structures required to provide both horizontal and vertical guideways is reduced inasmuch as the bed wing may be used interchangeably with either guide section, that is, the slide 3 or the column 4.

In the present embodiment, the slide is of relatively shallow construction and comprises a bottom plate 35ª having an accurately machined under-surface to rest upon the bed wing pads 29 and 30 and parallel side rails 36ª upstanding from the plate to form a shallow rugged channel. Preferably, the width of the slide corresponds to the width of the bed wing so that the latter with a slide assembled thereon will present a neat external appearance.

To provide a rugged yet detachable connection between the bed wing and the slide, the sides of the latter are recessed to receive the heads of the clamping screws 32 and provide ledges 38 having recesses therein through which the screws project and thread into the bed wing holes. Thus the slide may be secured interchangeably to any bed wing.

Accurate location of the slide or column guideways may be facilitated through the use of shims 36ᵇ (Fig. 46) between the pads on the bed wing and slide. Thus after rigid attachment of the bed wing to the pedestal, the different shims are ground or otherwise cut to the thickness to locate the slide guideways properly with respect to some established point such for example as the pedestal keyways 16. Then the screws 32 are tightened down and the relation of the slide and bed wing may be firmly established as by the use of suitable dowel pins 38ª (Figs. 4 and 47).

In the present instance, the slide is constructed with special slideways coacting with complemental surfaces on the saddle to form a rugged guide. These slideways are formed by machining the upper surfaces, the opposed side surfaces, and the under surfaces of two inturned flanges 39 formed integral with the rails 36 along the upper edges thereof.

A further advantage of forming the horizontal guideways on a part structurally separate from the bed wing is that variations in the length of tool travel may be provided for readily and economically. Thus where a greater travel is required than is obtained with the stock slide construction, a longer slide may be mounted on a regular bed wing with one end overhanging the end of the bed wing as shown in Fig. 60.

The vertical column

Where the tool must approach the work in a generally vertical direction, a column 4 is used instead of a slide 3 above described. Like the slide, the column is made as a separate unit in order to facilitate the attainment of different angles of approach by the use of angle spacers 9 and also to minimize the cost of special column constructions where such are required. The column is of hollow construction comprising two parallel side walls 40 rigidly joined by a back wall 41 and a forward wall 42 both of which terminate short of the upper ends of the side walls so as to afford access to the upper end of the column.

At its base, the column has pads machined to fit on the bed wing pads 29 and 30. The screws 32 and 34 for fastening the column to the bed wing thread into the holes 31 and 33 in the bed wing and extend through ledges 43 at the rear of the column and through holes 44 in a forwardly projecting flange near the base of the column. Shims may be interposed between the machined surfaces of the column and bed wing for alinement purposes.

In the form shown in Figs. 1 and 3, the side walls 40 of the column project forwardly from the upper part of the front wall 42 and have inturned flanges 45 formed integral therewith. These flanges are of the same cross-sectional shape and are machined to form guide surfaces of the same dimensions and spacing as the flanges 39 on the slide 3 so that a saddle 5 may be mounted interchangeably either on the slide 3 or on the column 4.

When it is desirable to counter-balance the weight of the saddle and the parts mounted thereon, the column also constitutes a housing for a counterweight 46 suspended from a chain 47 which extends around a pulley 48 for an attachment at 49 to the saddle which is guided by the column. The pulley is disposed above the upper end of the front column wall.

If desired, the range of adjustability of the vertical lines of approach may be increased by forming the column in two parts adapted to be separated by spacers of varying thickness. As shown in Figs. 43, 45 and 47, the stock slide unit 3 may serve as one of these parts, the column being formed with mounting pads 50 to which the slide may be secured by screws 51 in the same way as the slide is secured to the bed wing. Thus, in this modification, the slide may be used interchangeably as a part of the column 4' or on a bed wing 2 to provide either vertical or horizontal guideways. By interposing spacers between the slide and its supporting column 4', when used as shown in Fig. 47, the angular position of the guideway formed by the slide may be varied as desired.

The saddle

The general shape of this unit conforms to that of the slide and column guideways above described and also to the power pack unit 6 and the tool unit 7, both of which units are preferably demountably attached to the saddle to form a unitary tool head assembly. Herein, the saddle comprises an elongated block of approximately the same width as the slide 3.

The form of guideway herein shown for purposes of illustration comprises outwardly projecting flanges 52 and 53 along opposite sides of the saddle block defining between them outwardly opening longitudinal grooves which are adapted to receive the slide flanges 39 when the saddle is slid onto the slide in an endwise direction. The machined underside surfaces of the flanges 52 overlie and rest upon the upper slide surfaces while the upper surfaces of the flanges 53 are machined with tapers to permit the location of gibs 54 between these flanges and the slide flanges 39. The gibs are secured to one end of the saddle for longitudinal adjustment by suitable screws 55 to take up wear at the coacting horizontal surfaces of the slide and saddle. One of the saddle surfaces 56 bears directly against the slide flange and the other corresponding saddle surface is tapered and has a gib 57 extending therealong for engagement with the other slide flange. By adjustment of this gib, lateral wear may be taken up.

For purposes to appear presently, a keyway 58 and an upwardly opening groove 59 are formed in the upper surface of the saddle extending longitudinally thereof, the groove being interrupted intermediate its ends by an enlarged upwardly opening recess 60 for receiving certain parts of the power pack assembled thereon.

Means carried wholly by the saddle is provided for automatically lubricating the interengaging surfaces of the saddle and the slide or column. Herein this means comprises a pump 61 of the reciprocating piston type mounted within an oil receptacle 62 (Figs. 5, 6 and 9) secured to the saddle in a recess 63 on the under side thereof and arranged to be actuated by oscillation of an arm 64 projecting from the receptacle. The arm is urged by a spring 65 into engagement with an elongated inclined cam surface 66 on the slide (Fig. 4) or column (Fig. 1) carrying the saddle. Thus, the arm 64 is moved back and forth as the saddle reciprocates. On one stroke of the arm, the pump withdraws oil from the receptacle and on the reverse movement, discharges the same through suitable passages 67 (Figs. 5 and 6) for distributing the oil to the different coacting guide surfaces. In this manner, the ways are lubricated automatically. Since all of the moving parts of the lubricating mechanism are carried by the saddle, the mechanism will operate when the saddle is mounted on either of the guide sections 4 or 5, both of which are equipped with a pump actuating cam 66. The use of piping may be avoided by drilling the passages 67 in the saddle.

The power pack

In the present exemplary disclosure, those functions involving power driven or moving parts, including driving of the tool, effecting relative feed, rapid approach, and rapid return motions between the tool and the work, and automatically defining cycles of these motions are concentrated in and performed by this self-contained power actuated unit. Preferably, although not necessarily, the unit is made structurally separate from the saddle 5 and the tool unit 7 so that it may be detached readily and removed from the machine without necessitating removal of the saddle and without disturbing the position of the tool unit. This is especially advantageous in that any power pack which needs repair may be removed quickly and another stock unit immediately substituted therefor thereby avoiding any appreciable shut-down of the machine. The power pack thus removed may be taken to a separate shop where conditions are more favorable to the making of repairs than on the production floor.

In order to enclose the operating parts of the power pack and facilitate lubrication thereof, these parts are mounted within a common housing 68 adapted to rest upon the rear end portion of the saddle 5 and having a tongue 69 extending along the bottom wall and fitting snugly in the saddle keyway 58 so as to locate the power pack in a definite position laterally of the saddle. The housing comprises an elongated tubular central section closed at its rear end by a removable cover 70 and at its forward end by a plate 71 secured to the housing proper by suitable screws 71ª. To secure the housing detachably to the saddle, screws 72 (Fig. 9) are employed in the present instance extending through holes 73 in the saddle.

Driving of the tool where a rotary tool is used and also feed and rapid traverse motions are effected by electric power preferably by direct drive from electric motors 74 and 75 (Fig. 7) disposed within the housing 68. In the present instance, the former constitutes a combined tool-driving and feed motor and is made of the reversible type in order that tapping operations may be performed. The motor 75 is reversible and is arranged to produce rapid approach and rapid return motions according to the direction of its rotation when operated either simultaneously with or independently of the feed motor 74. For rotating the tools of the associated tool unit, the shaft 76 of the motor 74 carries a pinion meshing with a gear on a shaft 77 which projects through the end plate 71 at the forward end of the housing and carries a pinion 78 which provides one element of a disengageable coupling for extending the tool drive from the power pack to the tool unit while permitting independent removal of the tool unit or of the power pack from the saddle.

Where, as in the embodiment thus far described, the cutting tool is moved relative to the work-piece for machining the latter, the rotary motion produced by operation of the motors 74 and 75 either simultaneously or independently is converted into reciprocatory motion and transmitted to the saddle by two relatively rotatable feed elements which herein have constantly engaged driving connections with the motors so that a cycle of feed and rapid traverse motions in opposite directions may be defined simply by controlling the selective operation of the motors. In order to adapt the unit for tapping operations, the feed elements here employed comprise a lead screw 79 and an elongated nut 80 threaded thereon. To permit both motors to be located within the housing and avoid the use of spline connections, one of the feed elements, that is the screw 79, is stationarily anchored on the slide or column supporting the saddle, and differential gearing 81 is employed to combine the motions of the two motors.

In the embodiment shown, the differential gearing (see Fig. 7) is of the planetary type having terminal sun and ring gears 82 and 83 connected respectively to the rapid traverse and feed motors and planet gears 84 carried by two plates 85 rigid with the feed nut 80. The sun gear is on a sleeve 86 carrying a gear 87 meshing with a gear 88 fast on the shaft of the rapid traverse motor 75. The feed motor shaft 76 is connected to the ring gear 83 by worm and spur gearing 89 and worm gearing 90. With this arrangement, it will be apparent that the nut 80 may be rotated by either of the motors and will be advanced along the screw 79 in a direction and at a speed corresponding to that of the operating motor. In the event that the feed motor 74 is operated simultaneously with the rapid traverse motor, the rate of motion of the nut will be increased or decreased in an amount equal to the feed rate and according to the direction of the feed motor relative to the rapid traverse motor, but the net motion will be at a rapid traverse speed.

To hold the rapid traverse motor shaft against rotation when the feed motor only is operating, a friction brake 91 is held engaged by suitable springs 92. The brake is released automatically upon excitation of the motor 75 which energizes a solenoid 93 in the motor circuit and having an armature 94 arranged to shift a rod 95 axially of the motor shaft and disengage the braking elements.

In the present instance, the differential gearing, the screw and the nut are disposed close to the plane of the saddle slideways and are housed within elongated downwardly bulging parts (Fig. 9) of the housing 68, which parts are received in the recess 60 and the grooves 59 of the saddle when the power pack is placed thereon. The nut is supported by anti-friction thrust bearings 96. The screw projects from the forward end of the nut beneath the tool unit 7, and its forward end is detachably anchored to the guide section. For this purpose, a plate 97 to which the end of the screw is fastened as by a nut 98 is secured as by bolts to the slide 3 beyond the normal limits of travel of the saddle 5 preferably at the extreme forward end of the slide. The screw may be removably anchored in a similar way on the column 4 by means of a bracket 99 (Fig. 2) adapted to be secured detachably to the front column wall 42. In removing the power pack unit from the saddle, the screw 79 may be detached from the plate 97 or the bracket 99 and lifted off from the saddle with the power pack or it may be turned out of the nut 80, or the screw may be left attached to the slide or column and the nut run off from the rear end of the screw by power.

In addition to performing the tool driving and feeding functions, the power pack unit also serves to control the selective operation of the feed and rapid traverse motors and thereby define an automatic cycle of movements of the tool head assembly. This function is performed in the present instance, by the selective operation of control switches 101, 102, 104 and 105 (Figs. 7 and 19) by a series of manually adjustable dogs 106 on a control member which is mounted on the power pack but arranged for movement relative thereto in unison with the movements of the latter along the slideways. Herein the control member is in the form of an oscillatory disk 107 mounted within the housing 68. To drive the disk in unison with the reciprocatory movements of the tool head assembly whether produced by the feed motor, the rapid traverse motor or both, the disk is operatively connected through appropriate gearing 108 (Fig. 7) to the nut 80. Thus the disk will oscillate back and forth as the nut rotates in opposite directions.

The disk with the dogs thereon constitutes a timing element for determining the initiation and the termination of different parts of the machining cycle. In the present instance, the dogs operate the control switches through the medium of a selector or cam shaft 109 which is advanced unidirectionally with a step-by-step motion by a ratchet mechanism actuated each time a dog 106 on the disk is brought into operative association therewith.

The ratchet mechanism shown herein is of the mechanical type comprising a reciprocatory plunger 110 (Figs. 7 and 8) retracted by a spring 111 and carrying a roller 112 disposed in the path of inclined surfaces 113 on the dogs 106. Upon each depression of the plunger by one of the dogs, a pawl 114 on the plunger engages a tooth on a ratchet wheel 115 fast on the cam shaft and advances the cam shaft. Also fast on the cam shaft is a wheel 116 having inclined teeth 117 engaged by the pointed end of a spring pressed plunger 118. In the initial advance of the shaft by the pawl 114, the plunger 118 is cammed backwardly against the action of its spring 119 until the pointed end of the plunger rides over the center of the engaged tooth on the wheel 117. When this occurs, the energy stored in the spring projects the plunger forwardly and the plunger acts as a cam on the trailing tooth surface to advance the cam shaft ahead of the pawl 114 with a snap action until the plunger 118 becomes seated between two of the teeth 117. Thus, the cam shaft is advanced one step each time the plunger is depressed as a surface 113 on one of the dogs passes the plunger roller 112. The dogs may be formed with a single inclined surface as in the case of the terminal dogs of the row on the disk 107 or with two oppositely inclined surfaces as in the case of the intermediate dog which is thus adapted to advance the cam shaft when moving in either direction past the plunger roller 112.

The control switches 101, 102, 104 and 105 which operate in a manner later to be described in controlling the operation of the motors 74 and 75, are of simple construction comprising stationary contacts 120 adapted to be engaged by movable contacts 121 spring pressed toward switch-closed positions. The movable contacts of the switches 105 and 104 are carried by pivoted followers 122 and 123 while the movable contacts of the switches 102 and 101 are on common followers 124 and 125. The followers are associated with separate cams 126, 127, 128 and 129 (Figs. 7 and 27) on the shaft 109 and are actuated by these cams in a manner to be described later.

To enable the operating cycles to be changed quickly and conveniently, the cams are arranged in a plurality of sets, different ones of which may be brought into operative association with the followers by shifting the cam shaft axially into different positions determined by the entry of a detent screw 130 (Fig. 9) in grooves 131 on the cam shaft. For the purpose of such adjustment, the cam shaft is made in two parts having a spline connection 132 between them.

The tool unit

This unit, which is made in a plurality of different forms according to the type of metal removing process to be performed, provides a rugged mounting for one or more tools and in the case of rotary tools, transmits rotary power from the power pack to the tool spindles 133, while at the same time providing for ready detachment of the unit from the tool head assembly. The tool units shown herein (see Figs. 10 to 17) comprise a gear box 134 having one side adapted to fit upon the forward end of the saddle 5 and an open end abutting against the end wall 74 of the power pack housing, the box being secured rigidly but detachably in place by screws 135 and 136 (Fig. 9) extending into the box through holes in the saddle flanges 52 and in the vertical side edges of the power pack end plate 71. The gear box may be located on the saddle accurately by providing thereon a key 137 (Figs. 1 and 2) adapted to be received snugly in the saddle keyway 58. The tool unit may thus be removed from the saddle and replaced thereon without realinement.

Figure 14:
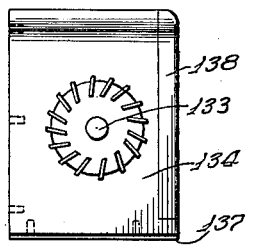
Figure 15:
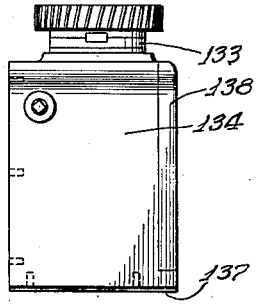
Figure 16:
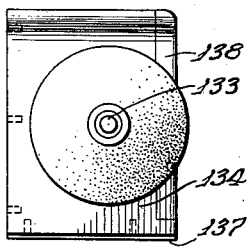
Figure 17:
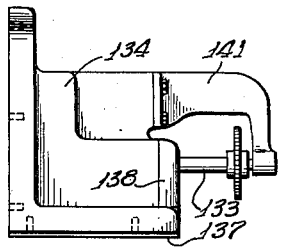
Figure 18:
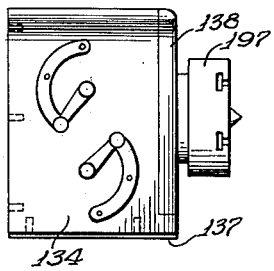

Removably secured to the end of the gear box 134 is a plate 138 which carries the bearings for the spindle or spindles and therefore is of a construction determined by the number, sizes, and arrangement of the spindles thereon. Within the gear box, the plate carries a demountable frame structure 139 rotatably supporting a gear 140 which meshes with the power pack drive pinion 78 when the tool unit is mounted in proper position on the saddle. The frame also carries the gearing connecting the gear 140 to the different spindles 133 for imparting rotary motion to the latter at the desired reduced speed. For single or multiple spindle applications wherein the work is machined by tapping, drilling or boring tools (see Figs. 10, 11 and 12) carried by spindles which project in the direction of motion of the tool head, the drive gearing may be of the spur type with the necessary bearings provided in the tool unit for sustaining the end thrust exerted on the spindles in operations of this kind. Extension of the spindle at right angles to the direction of movement of the saddle, as may be desirable for some milling and grinding operations, may be accomplished by the use of bevel gears in the driving connection. In such a case, the spindles may be extended through the side wall of the casing as shown in Figs. 14, 15 and 16. Where it is desirable to provide support for the outer end of the cutter spindle, a bracket arm 141 carrying the bearing may be secured to the end plate 138 as shown in Fig. 17.

The spacers

A wide variation in the horizontal lines of approach of the tools may be obtained by interposing between the bed wing 2 and the slide 3 a spacer 8 (Fig. 24) of the height necessary to obtain the desired elevation of the tool (see Fig. 31). The upper and lower surfaces of the spacer block are machined to fit against the bed wing and slide. The clamping screws 32 of the slide thread into holes 142 of the spacer and the spacer has inset ledges 143 through which clamping screws may be extended into the holes 31 of the bed wing.

Where the tool must approach the work in any other than a horizontal or a vertical direction as provided for by the main stock units above described, an angle spacer 9 (Fig. 25) may be inserted between the guide section 3 or 4 and the bed wing 2 and secured thereto in the same manner as the spacers 8. Thus by the construction of a relatively inexpensive part, any desired angle of approach may be obtained. The angle spacers are usable interchangeably between the bed wings and the slide or the column (see Figs. 33 and 34) and by forming the proper holes therein for receiving the clamping screws, the position of an angle spacer may be reversed so that one spacer may be used to obtain either an upwardly or a downwardly inclined angle of approach.

In the same way that the spacers 8 and 9 are used between the bed wing and horizontal or vertical guide section, a spacer 144 (Fig. 41) may be interposed between the pedestal and the bed wings to vary the horizontal angular relation of the angles of approach in a multiple way machine. For this purpose, the spacer 144 would be formed with oppositely facing machined surfaces adapted to abut against the pads on the pedestal and bed wing and with the holes and ledges 145 necessary for rigid juncture with the pedestal and bed wing in the same manner that the bed wing and pedestal are joined directly.

Electric circuits

While the cam operated switches above described may be utilized in various different circuit arrangements, two of such arrangements are diagrammed in Figs. 19 and 20 for purposes of illustration. In these diagrams, the rapid traverse motor 75, being of relatively small capacity, is controlled directly by the switches 101 and 102 while it is preferred to utilize the switches 104 and 105 through the medium of magnetic relay switches 146 and 147 to control the feed motor 74.

Referring now to the diagram of Fig. 19 which might be employed to define a typical tapping cycle, energization of the coil 148 of the relay switch 146 closes switches which connect the power leads 149, 150 and 151 to conductors 152 which lead to the feed motor through coils 153 of a standard thermal cut-out or overload relay 154. Power is thus supplied to the feed motor to initiate operation of the latter in a direction to feed the tool head assembly forwardly. Similarly, energization of the coil 155 of the relay switch 147 connects the feed motor to the power leads in a manner such as to cause reverse rotation of the motor and retraction of the tool head unit away from the work.

Herein the operating cycle is initiated by closure of any one of a plurality of energizing circuits for the magnetic relay 148. One of these extends from the power lead 149 through a conductor 157, the coil 156, a conductor 157a, a normally open manually operable master switch 158 to the power lead 150. As shown in Fig. 21, the master switch 158 is common to the energizing circuits for all of the power pack units 6 of any one machine so that the relays 156 of these different units may be energized simultaneously by closure of the switch. When the relay 156 of any power pack is thus energized, a switch 162 will be closed establishing an energizing circuit for the relay coil 148 extending from the power lead 149, the conductor 157, the coil 148, the switch 162, a conductor 163, the cam operated switch 104, a normally closed push-button switch 160 of the power pack, a conductor 165 having therein normally closed switches of an overload relay 166 and the overload relay 154, a normally closed push-button switch 168 of the master controller to the power lead 150. The relay coil 148 for any power pack may also be energized by closure of a normally open push-button switch 167 on such power pack. This connects one terminal of the coil 148 to the conductor 165 through the medium of a conductor 169. Thus, it will be observed that if the master switch 158 is closed, the relays 156 for all of the power pack units on the machine and therefore all of the motors 74 will be energized while the relays may be energized individually by closure of their respective switches 167.

Upon energization of the relay 148 to start the feed motor, a switch 170 is closed connecting one terminal of the coil to the conductor 163 thereby establishing a locking circuit which maintains the relay energized independently of the relay 156 or of the switch 168 until the cam operated switch 104 or one of the manually operated switches 160 or 168 is opened to interrupt the forward rotation of the feed motor. The energizing circuit for the coil 155 of the reverse relay switch 147 extends from the power lead 149 through a conductor 171, the coil 155, a conductor 172, the cam operated switch 105 to the stop switch 160 and thus is in parallel with the circuit of the coil 148 so as to be responsive to the push button switches 158 and 167.

In the exemplary circuit arrangement shown, the rapid traverse motion is obtained by simultaneous operation of the motors 74 and 75. The power supply for the motor 75 thus extends from the conductors 152, one of which leads directly to the motor. The other conductors lead to the switches 101 and 102. The switches 101 and 102 are connected to the motor 75 through the overload relay 166. The direction of operation of the motor is determined by which of the relay switches 146 and 147 is closed and also by which pair of the switches 101 and 102 is closed. The circuit for the brake solenoid coil 93 extends from the common contact of the switches 101 and 102 through a conductor 174, a normally closed push button switch 175, the coil 93 to the conductor 163. Thus the solenoid will be energized and the brake released whenever the rapid traverse motor is excited.

In order to obtain a high degree of compactness in the power pack unit 6 and render the bulk of the electrical equipment readily accessible, it is preferred to mount the relay switches 146 and 147, the relay 156 and the overload device 154 for each power pack unit within the bed wing which supports such unit. For this purpose, the relays and the overload device are herein disposed with the closet 35 at the end of the bed wing so as to be accessible after removal of the cover 36. The equipment which most frequently will need attention may be mounted on a panel 176 hinged at 177 (Fig. 22) within the closet 35. By removing the cover 36 and swinging the panel outwardly, the equipment may be exposed for purposes of replacement or repair. A push rod 178 operable from the exterior of the bed wing may be arranged to reset the overload relay 154 when depressed.

Referring to Figs. 19 and 20, the master push button switches 158 and 167 by which all of the power pack units of any one machine may be started and stopped simultaneously are mounted at a central point preferably near the pedestal 1. The conductors leading to these switches and the power leads extend through the conduit 21 into the junction box 22 to common terminals from which the branch power leads and branch conductors 157ª and 165 extend through the conduits 37 to the closets 35 in the different bed wings 2. From these closets, the power conductors and the conductors 159, 163, 165 and 169 extend through conduits 179 and terminate at spring contacts 180 mounted in insulated relation on a common support 181 (Fig. 23) which constitutes a cover for an opening on one side of the power pack housing. Within the latter are correspondingly spaced contacts 182 which are engaged by the respective contacts 180 when the support 181 is secured to the housing as shown in Fig. 23. Conductors lead from the contacts 182 to the motors and the control switches in the power pack unit. Where the power units are movably mounted, the conduits 179 are made flexible and in the case of horizontally movable power pack units extend through a hole 183 in a side wall of the supporting bed wing. In the case of a column, the major portion of the conduit may be housed within the column extending through a hole 184 in the top of the bed wing.

For machine cycles such as drilling and milling which do not require reversal of the direction of rotation of the cutter during the return movement of the tool head, the reversing relay switch 147 may be omitted from the circuit arrangement as shown in Fig. 19. Fig. 20 shows a wiring diagram for such cycles.

*Operation in typical cycles*

For an ordinary tapping cycle as represented in Fig. 26, the circuit arrangement shown in Fig. 19 would be employed, the cams 126 to 129 would be constructed as shown in Fig. 27, and dogs 106ª, 106ᵇ and 106ᶜ would be positioned on the disk 107 in proportion to the lengths of the different tool motions to be effected. At the start of the cycle, the parts would be in the relative positions shown in Figs. 7 and 27, the switches 102 and 105 being held open by the cams 127 and 129, the switches 101 and 104 being closed, and the ratchet plunger 110 held in advanced position by engagement of its roller 112 and the dog 106ª.

To start the cycle, the switch 158 or the switch 167 is closed momentarily whereupon the relay coil 148 will be energized to close the switches 146 and initiate operation of the feed motor 74 in the forward direction. Since the switches 101 are then closed, the rapid traverse motor 75 will also be started to move the tool head forwardly at rapid traverse speed. After its initial energization, the relay coil 148 is maintained energized by the locking circuit through the switch 170. The cam shaft 109 remains stationary until the roller 112 is engaged and the ratchet plunger 110 actuated by the dog 106ᵇ whereupon the cam shaft is advanced rapidly through an eighth of a revolution. In this movement, a lobe on the cam 126 opens the switches 101 whereupon the operation of the rapid traverse motor 75 is interrupted and the feed motor continues to operate to advance the tool head at feed speed and drive the tool to effect the tapping operation. After completion of the latter, the dog 106ᶜ actuates the ratchet plunger 110 to advance the cam shaft 109 through its second step during which the follower 122 rides off a lobe on the cam 129 allowing the switch 105 to close and a lobe on the cam 128 actuates the follower 123 to open the switch 104. The relay 148 is thus deenergized and the relay 155 energized thereby reversing the direction of rotation of the feed motor 74 and of the dog disk 107. The direction of rotation of the tool is thus reversed and the latter is withdrawn from the work at feed speed.

When the dog 106ᵇ again engages the roller 112 and actuates the ratchet plunger to advance the cam shaft 109 in its third step, the follower 125 rides off from the lobe on the cam 126 allowing the switches 101 to close which again initiates operation of the rapid traverse motor 75. But since the feed motor 74 is now energized through the reverse relay switch 147, the motor 75 runs in a direction reverse to its initial rotation thereby producing a rapid return motion. The cycle is terminated automatically upon the fourth movement of the cam shaft 109 which is produced by the dog 106ª and in which a lobe on the cam 129 opens the switch 105 to deenergize the relay 155, the switch 104 being allowed to close by the cam 128.

For drilling, milling, boring and other machining cycles comprising successive rapid approach, feed and rapid return motions, a set of cams 126ª, 127ª, 128ª and 129ª, constructed as shown in Fig. 28, would be associated with the followers 122, 123, 124 and 125 and the control dogs would be spaced according to the movements to be executed as shown in Fig. 29. At the start of the cycle, the switches 101 and 104 would be closed and the switch 102 would be held open by the cam 127ª. When one of the switches 158 or 167 is closed, the relay 148 is energized which initiates operation of the feed motor in a forward direction and also starts the rapid traverse motor in a corresponding direction through the then closed switches 101. In the first advance of the cam shaft 109 which occurs when the dog 106ᵉ actuates the ratchet plunger 110, a lobe on the cam 126ª opens the switches 101 thereby interrupting operation of the rapid traverse motor. The feed motor continues to operate to drive the tool and advance the same into the work piece during the cutting operation.

At the completion of the machining of the work piece, the dog 106ᶠ becomes effective to advance the cam shaft in its second step whereupon the follower 124 rides off from the lobe of the cam 127ª allowing the switches 102 to close to cause retraction of the tool out of the work. During the ensuing rapid return movement of the tool head, the dog 106ᵉ causes a third or idle advance of the cam shaft 109 without changing the condition of the control switches so that the return of the head continues until the next advance of the cam shaft caused by the dog 106ᵈ. In this advance, the follower 123 rides over a short lobe on the cam 128ª to open the switch 104 momentarily thereby interrupting the locking circuit for the relay coil 148 to stop the feed and rapid traverse motors but leaving the switch 104 closed and thus conditioned for initiation of the next cycle. In the same advance of the cam shaft, the cam 127ª opens the switches 102 while the follower 125 rides off a lobe on the cam 126ª, allowing the switches 101 to close.

The cycles above described are typical of the many different ones which may be executed. It will be observed that by varying the number and spacing of the dogs 106 on the timing element 107 and changing the configurations of the selector cams 126, 127, 128, and 129 which are in operative association with the followers, any desired cycle of rapid traverse and feed motions or multiples thereof may be obtained, such for example as where a succession of spaced surfaces are to be milled.

Building of different machines from stock units

Machine tools for performing a wide variety of metal removing processes may be constructed from the few stock units above described by assembling the units in the manner illustrated somewhat diagrammatically in Fig. 2, and Figs. 30 to 45, and making the electric power and control connections to the various units. From Figs. 30 to 35, it will be observed that any one-way horizontal or vertical machine may be built by assembling a work pedestal 1, a bed wing 2, a guide section, that is a slide 3 or a column 4, a saddle 5, a power pack 6, and a tool unit 7. The bed wing may be attached either to the short side (Figs. 31 and 35) or to the long side of the pedestal as desired. For horizontal lines of approach, a slide would be used as the guide section as shown in Fig. 30, or in the event that it is necessary to elevate the line of approach, a spacer 8 of the proper height may be interposed between the bed wing and slide (Fig. 31). A column is used where the line of approach is vertical (Figs. 32 and 35). The tool unit for each of these machines is of course constructed in accordance with the character and number of machining processes to be performed. Where the tool is to approach the work in any other than a horizontal or vertical direction, an angle spacer 9 may be interposed between the bed wing and the guide section. If the line of approach is approximately horizontal, a slide would be mounted upon the spacer as shown in Fig. 33, a column being similarly mounted when the angle is approximately vertical (Fig. 34).

As previously set forth, the saddles 5 are mountable interchangeably upon a slide 3 or a column 4, the column and slide are mountable interchangeably upon any bed wing 2, and the bed wings may be attached to any side of the pedestal 1. By virtue of this interchangeability, it will be seen that any one of the machines above described may, by rearrangement of the parts, or by substitution of a slide for a column or vice versa, be converted into any of the other machines. For example, the machine shown in Fig. 32 may be constructed from the units embodied in the machine of Fig. 30 simply by substituting a column for the slide in the latter machine. The tool unit would also be changed as required by the type of process to be performed or the location of the line of approach.

After construction of the units required to form any desired machine, the bed wings are first rigidly attached to the pedestal. Then by the use of the shims 38$^b$ of the proper thickness, the guide sections are loosely mounted on the bed wings until proper alinement has been obtained as above described, after which the guide sections are preferably doweled in place. The saddles are then fitted in their guideways, the power packs secured to the saddles, and the tool units located accurately. Finally, the electric conductors are extended into the pedestal through the bed wing to the relay closet 35 and thence through the conduit 179 which carries the terminal block 181 at its end adapted for attachment to the power pack.

Referring to Figs. 36 to 40, it will be observed that any conventional type of two-way machine may be built by assembling and rigidly securing together as above described one pedestal, two bed wings, two guide sections, two saddles, two power packs and two tool units. For example, a machine for performing machining operations on opposite vertical sides of a work piece may be constructed by attaching the bed wings to opposite sides of the pedestal as shown in Fig. 36 and utilizing two slides as the guide sections. By utilizing the same parts with the bed wings attached to one side and one end of the pedestal, the machine may be adapted for the approach of the tools toward the work at right angles to each other (Fig. 37). If one of the lines of approach is to be in a vertical direction, a column will be used to form one of the guide sections as shown in Figs. 38 and 39. Where two approximately vertical angles of approach are required, two columns may be used as shown in Fig. 40 and spacers 9 of the proper dimensions may be interposed between them and their supporting bed wings as shown in Fig. 40.

In view of the interchangeable character of the parts of the bed and guide structures, it will be seen that any one of the two way machines shown in Figs. 36 to 40 may be converted into any other one simply by rearrangement of the units or by substitution of one type of guide section for another. Or by omission of one of the bed wings and the parts supported thereby, the two way machine may be converted into a single way machine. Likewise, by the addition of units, any one of the single way machines shown in Figs. 30 to 35 may be converted into any one of the two way machines shown in Figs. 36 and 40. Where the lines of approach in a two way machine to be constructed are disposed at any other than a right angle relative to each other, such a machine may be formed from the stock of units by interposing a spacer 144 between one bed wing and the pedestal as shown in Fig. 41. The dimensions of such a spacer would be determined by the angle of approach desired.

In the same way that two way machines may be formed by duplication of the stock units except the work pedestal, three way machines also may be formed. Thus a three way horizontal machine may be built by assembling the parts as shown in Fig. 42. Or one of the approaches may be in a vertical direction by employing a column mounted as shown in Figs. 2 or 43. By the addition of another set of tool supporting and guiding units to a three way machine, a four way machine may be constructed as shown in Figs. 44 and 45.

From the foregoing, it will be seen that the units contemplated by the invention may be assembled in a relatively large number of relationships to form different machine tools. The only parts of any special nature which are required are the various tool units, as determined by number, size and location of the tools and the character of the processes to be performed, and the spacers which are used where unusual angles of approach are encountered. Both of these parts are of simple and inexpensive construction. As a result, various machine tools either of the single way or multiple way types may be built and any machine so constructed may be converted into any other machine of simpler or of more complex construction by subtraction or addition of the stock units and rearrangement of the parts according to the character of the machine to be built. The cost of making machine tool changeovers to accommodate changes in processes of manufacture is thus reduced to a minimum inasmuch as substantially all of the parts of a dismantled machine, at least all those of costly construction, may be reused in the building of other machines. The loss through obsolescence in service is thereby minimized. Furthermore, the cost of making repairs in service operation is effectually minimized by the invention by concentration of the major functions and those most apt to involve replacements and repairs in units which are readily demountable and replaceable. All major repairs may thus be made in a separate repair department without necessitating long periods of shut-down of any machine or of its associated machines. This wide range of flexibility in the initial construction of machine tools and the ready convertibility of one machine into another is due to the interchangeability of the units performing corresponding functions in the assembled machine. Such interchangeability is in turn attributable to the manner in which the functions of the group of machines which can be built are segregated in the different units so that these functions may be performed independently of the positional relations of the parts.

*Building of special machines*

The present method not only enables a wide variety of machine tools to be built as above described but also facilitates the construction of an additional large number of more or less special machines through the use of one or more parts of relatively simple yet special design in conjunction with the stock units above described. For example, the number and arrangement of the lines of approach of the tools toward the work may be varied as desired by varying the shape of one part, namely, the pedestal 1. Thus, the horizontal cross-sectional shape of the pedestal may be square, hexagonal, octagonal, or any other desired polygonal shape as illustrated in Figs. 58 and 59 according to the number of lines of approach desired.

Fig. 48 illustrates an application wherein vertically and horizontally moving tools operate on the same end portion of the work piece. For this application, a bridge column 186 would be used with its legs 187 straddling the line of approach of a horizontally moving power unit and supported by lateral extensions 188 of a bed wing 189. The column and the bed wing would be of special but relatively inexpensive construction.

For certain milling applications wherein the tool must move through a substantial distance horizontally, it may be desirable to attach the work pedestal to one side of the bed wing, preferably near one end thereof. This application requires a bed wing of a design which is special only to the extent of providing additional mounting pads 190 (Fig. 49) on one side wall. A bed wing of such construction could be formed at a low cost as by modifying the same pattern from which the stock bed wings 2 are formed. In fact, these and other auxiliary mounting pads might be provided on the stock bed wing constructions if low machining costs and the external appearance of the assembled machine are sacrificed for the sake of greater versatility in the use of the bed wing.

The invention contemplates that the stock units may be made in varying dimensions in order that machines of different sizes may be constructed. With the units thus constructed, the versatility of the present method is still further increased and a wider variety of machines may be constructed, for example, wherein the power and spindle units are stationarily mounted and the work is reciprocated. Thus, by employing a bed wing 191 (Fig. 57) shorter than the bed wing 2 above described and mounting thereon a spacer 192 (Fig. 56) to which a power pack 6 may be rigidly secured, the essential supporting and driving structure of a lathe or grinding machine may be built. The spacer 192 has opposite sides fashioned the same as the under side of the slide 3 and the upper surface of the saddle 5 so that it may be substituted for the slide and saddle unit where it is desired to mount the power pack stationarily while at the same time permitting independent removal of the power pack and spindle units. For example, in building a lathe, the units would be assembled as shown in Fig. 51 with the slide 3 supporting an adjustable tail-stock 193 and a reciprocatory carriage 194 having a cross-slide 195 mounted thereon and carrying a suitable tool. In guiding applications, the tool would take the form of a wheel 196 driven by an individual motor 196'. A work-supporting chuck 197 would be carried by the spindle unit 7 (Fig. 18) which would contain the necessary mechanism for effecting proper change of the speeds of rotation of the work supported by the chuck and tail-stock. Power for reciprocating the tool carriage 194 would be supplied by the power pack 6 and for this purpose, the projecting end of the power pack feed screw 79 would be attached rigidly to said carriage.

Milling machines wherein the work is supported by a reciprocating table may also be constructed from stock units of different sizes which may include an elongated bed wing 198 (Fig. 55) fashioned with pads 199 for attachment of another shorter bed wing 191 to one of its side walls. A slide 200 (Fig. 54) of a length corresponding to the bed wing 198 would be mounted on the latter as shown in Figs. 52 and 53 to provide ways for a reciprocable work table 201. For applications wherein a vertical face of the work piece is to be milled, the cutter would be mounted as shown in Fig. 52 on a tool unit 7 and driven by a power pack 6 stationarily mounted on a spacer 192 supported by a short length bed wing 191 which is attached to the pads 199. Or, as shown in Fig. 53, the tool and power units may be supported from a vertical column 4 where the top of the work piece is to be milled. To provide such a mounting and at the same time avoid construction of a special column, a saddle unit 5 carried by the column may be secured by suitable means against movement along the ways of the column. To effect reciprocation of the work table in these applications, the feed screw 79 of the power pack unit may be replaced by a rotary drive shaft 202 (Fig. 61) having the plates 85 of the differential gearing 81 fast thereon. The shaft 202 may be extended to the work table 201 by suitable speed reduction gearing 203 arranged to drive a pinion 204 meshing with a rack 205 on the work table.

It will be apparent from the foregoing disclosure that by following our method of construction, either single or multiple way machine tools may be built in such a manner that they will perform efficiently and satisfactorily a great variety of metal-removing processes, such as boring, milling, tapping, drilling, reaming, grinding, etc., merely by the selection, transposition or substitution of the proper preformed units in accordance with the particular machining process or processes to be carried out; and that the requisite interchangeability and universality to accomplish this purpose is attained by structural division along certain lines and by assigning to or segregating in the elemental units certain definite functions in such a manner that those functions will be performed either individually or conjointly with those of other units regardless of the varied positional relationships of the units contemplated by the invention.

We claim as our invention:

1. A machine tool having, in combination, a work pedestal having side walls fashioned for attachment of a plurality of bed wings thereto, a pair of structurally separate and interchangeable bed wings each having one end wall rigidly joined to said pedestal but detachable therefrom, structurally separate guide members having abutment surfaces fashioned for rigid attachment interchangeably to said bed wings, said members respectively providing horizontal and vertical guideways and each being rigidly secured to one of said wings, a pair of saddles having surfaces mating with said guideways, interchangeable tool units demountably secured to the respective saddles and each having a tool spindle, and power actuated mechanisms demountably carried by the respective saddles and each adapted to drive the tool spindle thereon and move the saddle back and forth along its supporting guideway.

2. A machine tool having, in combination, a work pedestal with more than two machined vertical side walls, a pair of structurally separate bed wings each having an end wall rigidly joined to one of said side walls but detachable therefrom and fashioned for attachment interchangeably to any one of said walls whereby said wings may be arranged in different angular relations, structurally separate guide members mountable interchangeably upon said bed wings in any of said relations and each secured to one of the wings and providing an elongated guideway, a plurality of tool heads each slidable in one of said guideways and each carrying self-contained power actuated mechanism arranged to move the head back and forth along the supporting guideway in any of the different relations of said bed wings, and structurally separate interchangeable tool units detachably mounted upon said heads.

3. A machine tool comprising, in combination, a structurally separate work supporting pedestal having vertical side surfaces fashioned for rigid attachment of bed wings thereto in any one of a plurality of different horizontal angular relationships, a pair of structurally separate bed wings each having one end fashioned for attachment to any one of said pedestal surfaces, said bed wings being rigidly joined to said pedestal in one of said relationships, interchangeable structurally separate guide members detachably mounted on the respective bed wings and providing horizontal guideways, a plurality of interchangeable power units mounted to slide along said guideways and each carrying self-contained power actuated tool driving mechanism arranged to move the unit along its guideway, and interchangeable tool units mounted for movement with the respective power units and each having a tool spindle driven thereby.

4. A machine tool having, in combination, a bed structure providing a work support having a wing projecting horizontally therefrom and a plurality of vertical side surfaces, a structurally separate bed wing having an end wall fashioned for rigid juncture interchangeably with either of said surfaces so as to extend at different angles relative to said first mentioned wing, a structurally separate slide providing a horizontal guideway and secured upon one of said bed wings but demountable therefrom and attachable to any of the other bed wings, a structurally separate column secured to one of said bed wings but mountable interchangeably upon any of the other bed wings, saddles slidable on the guideways of said slide and column, power mechanism on each of said saddles operable to move the saddle back and forth along the supporting guideway, and interchangeable tool units demountably secured to said saddles and having a driving connection with the respective power mechanisms.

5. A machine tool having, in combination, a work-supporting pedestal of polygonal shape having adjacent vertical side walls fashioned for attachment of bed wing units thereto, a separately formed bed wing unit attachable interchangeably to any of said walls and rigidly connected to one of the walls, a separately formed guide member detachably secured to said bed wing unit and providing spaced parallel ways disposed in horizontal position, a unitary tool head having surfaces mating with said ways and carrying self-contained power driving mechanism operable to move the head back and forth along the ways, and an interchangeable tool unit demountably secured to said head and carrying a tool spindle having a disengageable driving connection with said mechanism.

6. A machine tool having, in combination, a pedestal for supporting a work piece and having a fashioned vertical side surface, a separately formed interchangeable bed wing rigidly attached to said surface, a separately formed guide section detachably secured upon the upper surface of said bed wing and having surfaces forming a guideway, a saddle having surfaces mating with said guideway surfaces, an interchangeable member demountably secured to said saddle, self-contained power driving mechanism mounted on said member for removal bodily therewith and operable to move said saddle back and forth along said guideway, and an interchangeable tool unit detachably supported by said saddle and having a disengageable driving connection with said mechanism.

7. A machine tool having, in combination, a work-supporting pedestal fashioned for the attachment of a bed wing thereto in a plurality of angularly spaced positions, a bed wing having one end wall fashioned for rigid juncture with said pedestal in any one of said positions, a structurally separate guide member having an under surface fashioned for rigid attachment upon said bed wing and having ways along its upper surface providing a horizontal guideway when the member is mounted on the bed wing, a saddle slidable in said guideway and carrying self-contained power actuated driving mechanism operable to move the saddle as a unit back and forth along said guideway, and an interchangeable tool unit detachably mounted on said saddle and having a detachable driving connection with said mechanism.

8. A machine tool having, in combination, a bed structure providing a work support and having a wing extending horizontally therefrom, a separately formed member providing elongated guideways and fashioned for rigid attachment upon said bed section, a tool head slidable on said guideways, power actuated tool driving and relative tool and work feeding mechanism carried wholly by said head and movable as a unit therewith, and a separately formed spacer interposed between said bed section and said member and having opposite non-parallel sides rigidly attached to the upper surface of the bed wing and the under surface of said member.

9. A machine tool having, in combination, a saddle having guide surfaces thereon, a support having complemental guide surfaces slidably supporting said saddle, a structurally separate unit secured detachably to said saddle and carrying self-contained power-actuated driving mechanism thereon for reciprocating said saddle along said support, a tool unit secured detachably to said saddle and having a spindle with a detachable driving connection with said mechanism, said units being detachable bodily from the saddle independently of each other.

10. A machine tool having, in combination, a saddle having elongated guide surfaces thereon, a support providing a guideway having surfaces mating with said guide surfaces and supporting said saddle for reciprocation toward and away from a work piece, a tool spindle rotatably supported by said saddle, a member mounted on said saddle for detachment as a unit therefrom, a feed element operatively connected to said support, and power actuated mechanism carried wholly by said member including an electric driving motor arranged to impart rotary power to said spindle and to act on said element so as to reciprocate said saddle back and forth along said guideway, said mechanism and said member constituting an interchangeable power unit which may be removed bodily from said saddle for replacement or repair without removal of said saddle from said guideway.

11. A machine tool having, in combination, means providing elongated guideways, a member having guide surfaces mating with said guideways, a unitary structurally separate power actuated mechanism carried by said member and detachable as a unit therefrom whereby to permit independent removal and replacement of said mechanism as a unit without disturbing the relation between said guideways and said surfaces, said mechanism including means operable to effect reciprocation of said member back and forth along said guideways.

12. A machine tool having, in combination, means providing an elongated guideway, a saddle having guide surfaces mating with said guideway, a member detachably secured to said saddle and carrying self-contained power mechanism operable to effect movement of the member along said guideway, a second member detachably secured to said saddle and rigidly and detachably connected to said first mentioned member, whereby either of said members may be removed from said saddle independently of the other member, and a tool carried by said second member.

13. A machine tool having, in combination, a bed structure providing an elongated guideway, a head slidable along said guideway, an electric motor carried by said head and operable to supply power for moving said head along said guideway, electric control equipment including a magnetic relay switch housed within said bed structure and arranged to govern the starting and stopping of said motor, and switch means actuated as an incident to movement of said head and operating to govern the operation of said control equipment.

14. A multiple way machine tool having, in combination, a hollow work-supporting pedestal, bed wings radiating from said pedestal, tool heads slidably carried by the respective bed wings and each carrying an electric motor for effecting reciprocatory movement of the head, magnetic relay switches housed within said bed wings, electric power conductors housed within said pedestal and extending through the sides thereof to the switches in each of said bed wings, switching means associated with each of said heads and responsive to the movement thereof, and conductors extending between the switching means of each head and the relays in the bed wing which supports such head and connecting the relay switches with the respective motors.

15. A machine tool having, in combination, a work-supporting pedestal, a plurality of structurally separate bed wings radiating therefrom and rigidly attached thereto, a guideway mounted on each of said bed wings, a plurality of tool heads each slidable in one of said guideways and having means thereon including an electric motor arranged to move the head along its supporting guideway, and conductors for supplying power to said motors extending from a common junction point within said pedestal to the respective motors through the bed wings by which the respective tool heads are supported.

16. A machine tool having, in combination, means providing a guideway, a head slidable on said guideway, power driven mechanism carried by said head and operable to impart reciprocatory motion thereto, a sump containing lubricating fluid, means on said head for distributing fluid to different parts of said guideway, and a pump carried by said head and arranged to be actuated automatically in the reciprocation thereof along said guideway, said pump operating to withdraw fluid from said sump and deliver the same to said distributing means.

17. A machine tool organization having, in combination, a bed structure providing horizontal and vertical guideways, a saddle mountable interchangeably on either of said guideways for reciprocation therealong, power actuated mechanism on said saddle for moving the latter along its guideways while permitting detachment and removal of the saddle as a unit from the guideways, and automatic mechanism for lubricating said guideways mounted wholly on said saddle including a sump containing lubricating fluid, means for distributing the fluid to the guideways on which the saddle is mounted, and a pump actuated automatically as an incident to the reciprocation of the saddle either along said horizontal or said vertical guideways and operating to withdraw fluid from said sump and deliver the same to said distributing means.

18. A machine tool construction comprising, in combination, a bed structure composed of structurally separate pedestal and wing units detachably secured together, a work support and a rotary spindle mounted respectively on said units for rectilinear movement relative to each other, an interchangeable structurally separate power unit embodying feeding and spindle driving mechanism which includes electric motor means and mechanical connections therefrom serving simultaneously to rotate said spindle and effect relative feeding movement between the spindle and said work support, a separately formed supporting member located between said bed structure and said power unit and having its sides fashioned to conform to the shape of said power unit and a portion of said bed structure and serving to detachably support said power unit in position to correlate the tool spindle therein with said work support while permitting independent removal of said unit therefrom without disturbing the relation of said spindle and work support, and cycle-controlling mechanism responsive to the relative movement between said spindle and work support and operable to govern the operation of said motor means, said cycle-controlling mechanism being incorporated in said power unit and removable bodily from said member along with said unit.

19. A machine tool construction comprising, in combination, a bed structure composed of structurally separate units detachably secured together, a work support and a rotary spindle carried by said structure for rectilinear movement relative to each other, an interchangeably self-contained power unit embodying feeding and spindle driving mechanism which includes electric motor means and mechanical connections therefrom serving simultaneously to rotate said spindle and effect relative feeding movement between the spindle and said work support, and a separately formed interchangeable supporting member located between said bed structure and said power unit and having its sides fashioned respectively to complement the shape of said power unit and a portion of said bed structure and serving to support said power unit in position to correlate the spindle therein with said work support while permitting removal of said unit.

20. A machine tool having, in combination, means providing a slideway, a support mounted to move along said slideway, a machine tool element mounted on said support, power driven means arranged to move the support back and forth, a reservoir for lubricating fluid on said support, a conduit on said support providing a passageway for distributing lubricating fluid to said slideway in the movement of the support, and means actuated automatically as an incident to movement of the support and operable to cause a flow of fluid from said reservoir into said conduit.

21. A machine tool having, in combination, means providing a slideway, a support mounted to move along said slideway, a machine tool element mounted on said support, power driven means arranged to move the support back and forth, a reservoir for lubricating fluid on said support, a conduit on said support providing a passageway for distributing lubricating fluid to said slideway in the movement of the support, and a pump on said support actuated automatically as an incident to movement of the support and operable to withdraw fluid from said reservoir and discharge the same into said conduit.

22. A machine tool having, in combination, a bed structure, a column having a bottom surface fashioned to fit upon the top of said bed structure and detachably secured to the latter, an elongated member fashioned to fit against a vertical surface of said column and detachably secured thereto, means on the side of said member opposite the column providing a substantially vertical guideway, and a machine tool element slidable on said guideway, the mounting surfaces of said column and bed structure being similarly fashioned whereby said member may be mounted interchangeably on said bed structure and column to locate said guideway either horizontally or vertically.

23. A machine tool having, in combination, a bed structure having an upwardly facing attachment surface, a column adapted to rest upon said bed structure and having a bottom surface fashioned for rigid juncture with said first mentioned surface and a vertical fashioned surface, a member having a surface fashioned to fit interchangeably against either said first mentioned surface or said vertical surface, and a slideway on said member extending substantially parallel to the fashioned surface thereof, said slideway being disposed in vertical and horizontal positions respectively when said member is attached to said column and said bed structure.

24. A machine tool having, in combination, a work pedestal having a plurality of angularly related vertical side walls, a bed wing rigid with one of said side walls, a column upstanding from said bed wing, a slide member rigid with said column and providing an elongated tool guideway facing said pedestal, a carriage slidable in said guideway and supporting a demountable tool-carrying unit and power driven mechanism for driving the tools of said unit and moving the carriage back and forth along said guideway in automatically defined cycles of feed and rapid traverse motions whereby to constitute said member and said carriage a self-contained tool guiding, driving and feeding unit, said pedestal, said bed wing, said column and said slide member being formed as structurally separate elements having complemental adjoining surfaces rigidly but detachably secured together whereby to permit the machine tool to be converted into one having a horizontal tool approach by attachment of said member directly to said bed wing, to permit the line of tool approach to be varied by the interposition of a spacer between two of the adjoining elements, and to permit the number of lines of tool approach to be increased by the attachment of additional similarly constructed and equipped bed wings to said pedestal walls.

25. A machine tool having, in combination, a work pedestal, a bed wing rigid with and projecting horizontally from said pedestal, a column upstanding from said bed wing, a slide member rigid with said column and providing an elongated tool guideway facing said pedestal, a carriage slidable in said guideway and supporting a demountable tool-carrying unit and power driven mechanism for driving the tools of said unit and moving the carriage back and forth along the guideway in automatically defined cycles of feed and rapid traverse motions whereby to constitute said member and said carriage a self-contained tool guiding, driving and feeding unit; said bed wing, said column and said member being formed as structurally separate elements having complemental attachment surfaces with the adjoining surfaces of the adjacent elements rigidly but detachably secured together whereby to permit the machine tool to be converted from a vertical to a horizontal way machine by attachment of said slide member directly to said bed wing or to permit the angle of tool approach in the horizontal or vertical machine to be varied by the interposition of rigid spacer members between the abutting surfaces of two of the adjacent elements.

26. The method of constructing machine tools for the performance of any one of a variety of distinct types of metal removing operations, which comprises preforming and fashioning structurally separate units for interchangeable attachment together in a variety of different relations as required by the angle and number of lines of relative approach between the tool and the work, such preforming and fashioning being effected along such lines of division between such units as to segregate in each unit a distinct and individual function which is common to all of the machine tools to be constructed, so that each unit will perform its individual function irrespective of its positional relation to the other units when assembled, selecting particular units having the functions required for a particular machine, and securing together the selected units in operative relation to carry on the particular metal removing process desired.

27. The method of constructing machine tools for the performance of any one of a variety of distinct types of metal removing operations, which comprises preforming and fashioning structural separate units for interchangeable attachment together in a variety of different relations as required by the angle and number of lines of relative approach between the tool and the work, such preforming and fashioning being effected along such lines of division between such units as to segregate in each unit a distinct and individual function which is common to all of the machine tools to be constructed, so that each unit will perform its individual function irrespective of its positional relation to the other units when assembled, such lines of division providing at least (a) a support in two units both adapted to rest on the floor and carry the tool and work respectively at a working height, (b) a guide for directing the line of approach between the tool and the work, (c) a saddle complementing said guide, (d) a power unit for effecting such approach, and (e) a tool-carrying unit, selecting particular units having the functions required for a particular machine, and securing together the selected units in operative relation to carry on the particular metal removing process desired.

28. A machine tool organization comprising a pedestal for supporting a work fixture, a bed wing fashioned for rigid juncture with the upright sides of said pedestal in any one of a plurality of different angular positions, a column having a bottom surface fashioned for rigid juncture with the top wall of said bed wing and having a vertical wall positioned on one side to face toward said pedestal when the column is attached to said bed wing, a slide providing an elongated guideway and having a bottom surface fashioned for rigid juncture selectively with said column wall and bed wing wall and a powered tool head having ways fashioned to mate with said guideway.

29. A machine tool organization comprising a pedestal for supporting a work fixture, a bed wing fashioned for rigid juncture with a side of said pedestal, a column having a bottom surface fashioned for rigid juncture with the top wall of said bed wing and having a vertical wall positioned on one side to face said pedestal when the column is attached to said bed wing, a slide providing an elongated guideway and having a bottom surface fashioned for rigid juncture selectively with said column and bed wing walls, a spacer element having angularly related side surfaces one fashioned for rigid juncture interchangeably with the bottom surfaces of said slide and column and the other fashioned for rigid juncture with the top wall of said bed wing, and a powered tool head having ways fashioned to mate with said guideway.

30. A machine tool organization comprising a work pedestal having an upright attachment surface, a support having a horizontal top wall and fashioned for rigid juncture at one end with said surface, a second support having an upright surface fashioned for rigid juncture with said first mentioned surface, and having a vertical wall positioned to face said work pedestal when said second support is attached to said pedestal, said supports being interchangeably attachable to said pedestal, a guide member providing an elongated guideway along one side and having a surface on the opposite side fashioned for rigid juncture interchangeably with the said walls on said supports respectively, and a carriage having ways mating with the said guideway.

31. A machine tool organization comprising a work pedestal having an upright attachment surface, a support having a horizontal top wall and fashioned for rigid juncture at one end with said surface, a second support having an upright surface fashioned for rigid juncture with said first mentioned surface, and having a vertical wall positioned to face said work pedestal when said second support is attached to said pedestal, said supports being interchangeably attachable to said pedestal, a guide member providing an elongated guideway along one side and having a surface on the opposite side fashioned for rigid juncture interchangeably with the said walls on said supports respectively, a saddle having ways mating with said guideway, a tool-carrying unit demountably attachable to said saddle, and a self-contained power driven tool driving and feeding mechanism also demountably carried by said saddle.

32. A supporting frame structure for machine tools having, in combination, a work pedestal unit and two bed wing units structurally separate therefrom constituting a supporting base of the machine, said pedestal unit having a plurality of upright faces and each of said bed wing units having at least one upright face, the said faces on said pedestal unit and on said bed wing units respectively being fashioned to complement each other so that said bed wing units may be interchangeably secured to said pedestal unit with their respective faces in abutment, a column unit having an attachment face on its lower end, and said bed wing units having upwardly facing attachment faces fashioned to complement said face on said column unit so that said column unit may be interchangeably secured to either of said bed wing units with their respective complementary faces in abutment.

33. A frame structure for machine tools comprising a work pedestal, a structurally separate bed wing having an upwardly facing attachment surface, a structurally separate column having a downwardly facing attachment surface, means for rigidly but detachably connecting said bed wing and column together with said two surfaces opposed to each other, a structurally separate guide element having an attachment surface and having a guideway along its opposite side, said column also having an approximately upright attachment surface along one side thereof corresponding to the attachment surface on said base, and means for rigidly but detachably connecting said guide element either to said upright surface on said column or to said upwardly facing surface on said bed wing with their respective attachment surfaces opposed to each other.

34. In a machine tool, the combination of a pedestal for supporting a work fixture, a bed wing unit having a horizontal attachment surface, another unit having a vertical attachment surface, a guide member attachable interchangeably to said surfaces and providing an elongated guideway extending approximately parallel thereto, a tool carriage slidable in said guideway, and means for interchangeably and rigidly connecting said units to a vertical wall of said pedestal whereby to define a horizontal or vertical line of approach of said carriage relative to said fixture.

35. In a machine tool assembly, the combination of a work pedestal, two supports each having an attachment face disposed respectively at angles less than and more than forty-five degrees from the horizontal, a separate guide element fashioned for detachable mounting upon the said face of either of said supports, and a tool carriage slidably mounted upon said guide element, said two supports being structurally separate from each other and from said pedestal and being interchangeably attachable to a face of said pedestal, whereby the lines of approach of the tool toward said pedestal may be changed at will by substituting one of said supports for the other.

36. A machine tool having, in combination, a pedestal for supporting a work fixture and having an upright attachment surface on one side, a bed wing providing an upwardly facing horizontal wall and having an end surface complementing and rigidly joined in abutting relation to said attachment surface, a column having a bottom surface complementing and rigidly joined to said bed wing wall, said column providing an elongated guideway on the side adjacent said pedestal, a tool head reciprocable in said guideway and carrying rotary cutting tools for operating upon a work piece supported by said pedestal, and self-contained power driven tool driving and head feeding mechanism carried by and movable as an entity with said head, said pedestal, said bed wing, and said column all being formed as structurally separate units whereby to permit the line of reciprocation of said head relative to said pedestal to be varied by the interposition of rigid angle spacers between the abutting surfaces of said bed wing and column and between the abutting surfaces of said bed wing and pedestal.

37. A machine tool having, in combination, a bed structure providing a work support and a substantially horizontal attachment surface, a column having a bottom surface detachably secured to said surface and a vertical wall facing said work support, two complementary guide elements having elongated mating guideways by which said elements are adapted for rectilinear reciprocation, one of said elements having a surface detachably secured against said wall and also fashioned for rigid attachment alternatively to said first mentioned surface, whereby the other guide element may be mounted on said bed structure for horizontal or vertical reciprocation, and a self-contained power actuated tool driving and feeding mechanism detachably mounted on said other guide element for effecting reciprocation of the latter element along said guideway in either position of the latter.

38. A machine tool having, in combination, two complementary guide elements having elongated mating guideways by which said elements are secured together for relative rectilinear reciprocation, a supporting base structure upon which one of said elements is detachably mounted, a tool unit detachably mounted on the second one of said elements, and a unitary power head also detachably mounted upon the second element for removal independently of said tool unit and having a detachable driving connection with the tool in said tool unit.

39. A machine tool having, in combination, two complementary guide elements having mating guideways along their adjacent sides allowing relative reciprocation thereof, each of said elements being dimensioned to be thin in a direction transverse to the plane of said reciprocation, the sides of said elements opposite to or remote from said guideways being fashioned for detachable mounting respectively to a stationary supporting structure and to a power actuated tool driving and feeding unit which it is desired to reciprocate along said guideways.

RAYMOND S. PERRY.
JOHN R. JOHNSON.
ALEXANDER OBERHOFFKEN.